United States Patent
Kaseyama et al.

(10) Patent No.: US 11,440,993 B2
(45) Date of Patent: Sep. 13, 2022

(54) TRIAZINE-RING-CONTAINING POLYMER AND COMPOSITION INCLUDING SAME

(71) Applicant: NISSAN CHEMICAL CORPORATION, Tokyo (JP)

(72) Inventors: Takahiro Kaseyama, Funabashi (JP); Naoya Nishimura, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 299 days.

(21) Appl. No.: 16/762,276

(22) PCT Filed: Oct. 31, 2018

(86) PCT No.: PCT/JP2018/040511
§ 371 (c)(1),
(2) Date: May 7, 2020

(87) PCT Pub. No.: WO2019/093203
PCT Pub. Date: May 16, 2019

(65) Prior Publication Data
US 2021/0179779 A1    Jun. 17, 2021

(30) Foreign Application Priority Data
Nov. 8, 2017  (JP) .............................. JP2017-215581

(51) Int. Cl.
*C08G 73/06*    (2006.01)
*C08K 5/18*    (2006.01)
*C08K 5/3492*    (2006.01)
*C08L 79/06*    (2006.01)
*G02B 1/04*    (2006.01)

(52) U.S. Cl.
CPC ............ *C08G 73/0644* (2013.01); *C08K 5/18* (2013.01); *C08K 5/3492* (2013.01); *C08L 79/06* (2013.01); *C08L 2201/08* (2013.01); *C08L 2201/10* (2013.01); *C08L 2203/16* (2013.01); *C08L 2203/206* (2013.01); *C08L 2312/00* (2013.01); *G02B 1/04* (2013.01)

(58) Field of Classification Search
CPC ........ C08G 73/0644; C08K 5/10; C08K 5/18; C08K 5/3492; C08L 79/04; C08L 79/06; C08L 2201/08; C08L 2201/10; C08L 2203/16; C08L 2203/206; C08L 2312/00; G02B 1/04
See application file for complete search history.

(56) References Cited

U.S. PATENT DOCUMENTS

2012/0049308 A1    3/2012  Nishimura et al.
2013/0289203 A1*   10/2013  Nishimura .............. G02B 1/04
                                                    524/612
(Continued)

FOREIGN PATENT DOCUMENTS

JP    2004-156001 A    6/2004
JP    2013-245206 A    12/2013
(Continued)

OTHER PUBLICATIONS

International Search Report, issued in PCT/JP2018/040511, PCT/ISA/210, dated Jan. 22, 2019.
(Continued)

*Primary Examiner* — Robert S Jones, Jr.
(74) *Attorney, Agent, or Firm* — Birch, Stewart, Kolasch & Birch, LLP

(57) ABSTRACT

A triazine-ring-containing polymer characterized by including a repeating unit structure represented by formula (1).

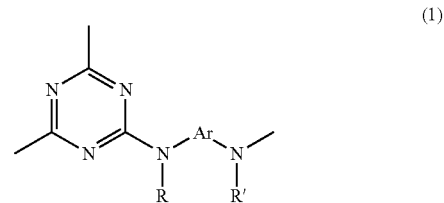

(1)

[In the formula, R and R' each independently represent a hydrogen atom, an alkyl group, an alkoxy group, an aryl group, or an aralkyl group, and
Ar represents at least one selected from the group shown by formulas (2) and (3).

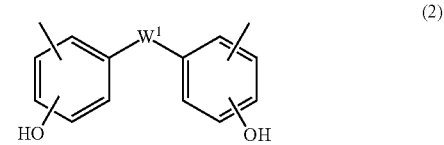

(2)

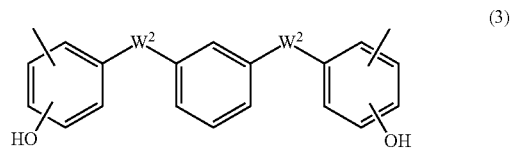

(3)

[in the formulas, $W^1$ and $W^2$ each independently represent $CR^1R^2$ ($R^1$ and $R^2$ each independently represent a hydrogen atom or a C1-10 alkyl group optionally substituted by a halogen atom (where these together may form a ring)), C=O, S, SO, or $SO_2$.]]

14 Claims, 8 Drawing Sheets

(56) References Cited

U.S. PATENT DOCUMENTS

2014/0371367 A1* 12/2014 Nishimura ........... C09D 179/04
                                                                   524/413
2016/0312062 A1    10/2016 Kaseyama

FOREIGN PATENT DOCUMENTS

| JP | 2014-141596 A | 8/2014 |
|----|---------------|--------|
| JP | 2016-145913 A | 8/2016 |
| WO | WO 2010/128661 A1 | 11/2010 |
| WO | WO 2015/093508 A1 | 6/2015 |
| WO | WO 2017/110810 A1 | 6/2017 |
| WO | WO 2017/183461 A1 | 10/2017 |

OTHER PUBLICATIONS

Written Opinion of the International Searching Authority, issued in PCT/JP2018/040511, PCT/ISA/237, dated Jan. 22, 2019.

* cited by examiner

TRIAZINE-RING-CONTAINING POLYMER AND COMPOSITION INCLUDING SAME

TECHNICAL FIELD

The present invention relates to a triazine-ring-containing polymer and a composition including the polymer.

BACKGROUND ART

To date, it has already been found that hyperbranched polymers including a triazine ring as a repeating unit are capable of achieving high heat resistance, high transparency, high refractive index, high solubility, and low volume shrinkage ratio by the polymers alone, and suitable as materials for film formation in preparing electronic devices and optical members (Patent Document 1).

Optical materials provided with thin films prepared from compositions including the polymers, however, may have the problem of thin film degradation due to light (sunlight or ultraviolet light), depending on the skeletons, and improvements in lightfastness have been required.

As a means for enhancing the lightfastness of a thin film including a triazine-ring-containing hyperbranched polymer, an approach of adding an ultraviolet absorber and a light stabilizer is reported (Patent Document 2), and this approach allows degradation to be prevented to some extent, but the thin film shows changes in refractive index and transmittance over time, and it is not possible to determine that the approach has a sufficient effect.

In addition, it is reported that the use of a diamine raw material that has an alicyclic structure makes it possible to impart high lightfastness to the hyperbranched polymer itself (Patent Document 3), but in the case where the alicyclic structure is used, there is a relation of trade-off with the refractive index, and there is a need for improvement in terms of the refractive index, and there is also room for improvement in terms of heat yellowing resistance against such high temperatures in excess of 200° C.

In contrast, the inventors have reported that a triazine-ring-containing polymer that has a diamine-derived skeleton with two or three benzene rings bonded with a non-conjugated element interposed therebetween provides a thin film with a high refractive index and high lightfastness, and that the use of a composition including the polymer and various crosslinking agents achieves a cured film which has excellent lightfastness and heat yellowing resistance while maintaining a high refractive index (Patent Document 4).

Now, for spacers, insulating films, protective films, and the like in liquid crystal display elements, pattern formation with the use of a transparent material has been performed, and to date, many photosensitive negative-type compositions and photosensitive positive-type compositions have been proposed for this intended use. In addition, photosensitive resins may be used for white pixels of color filters for liquid crystal display elements.

The triazine-ring-containing polymer in Patent Document 4 is, however, high in refractive index, and excellent in lightfastness and heat yellowing resistance, but low in solubility in an alkaline developer, and thus is not suitable as a material for pattern formation.

PRIOR ART DOCUMENTS

Patent Documents

Patent Document 1: WO 2010/128661
Patent Document 2: WO 2015/093508
Patent Document 3: JP-A 2014-141596
Patent Document 4: WO 2017/110810

SUMMARY OF INVENTION

Technical Problem

The present invention has been achieved in view of the circumstances mentioned above, and an object of the present invention is to provide a triazine-ring-containing polymer which has high solubility in an alkaline developer, can form a thin film with a high refractive index and excellent weather resistance, and can form even a fine pattern with a high refractive index, and a composition including the polymer.

Solution to Problem

The present inventors have conducted intensive studies to achieve the object mentioned above, and as a result, found that a triazine-ring-containing polymer having a diamine-derived skeleton where two benzene rings having a hydroxyl group are bonded with a non-conjugated spacer group interposed therebetween has high solubility in an alkaline developer, and provide a thin film with a high refractive index and high lightfastness, and found that the use of a composition including the polymer and various crosslinking agents can form a cured film which has excellent lightfastness and heat yellowing resistance while maintaining a high refractive index, and form even a fine pattern with a high refractive index, thereby achieving the present invention.

More specifically, the present invention provides the following:

1. A triazine-ring-containing polymer comprising a repeating unit structure represented by the following formula (1):

[Chem. 1]

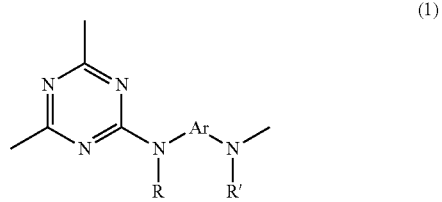

wherein R and R' each independently represent a hydrogen atom, an alkyl group, an alkoxy group, an aryl group, or an aralkyl group, and Ar represents at least one selected from the group represented by formulas (2) and (3),

[Chem. 2]

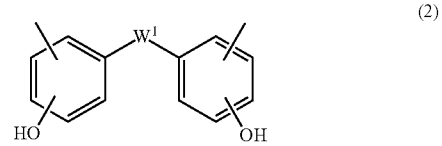

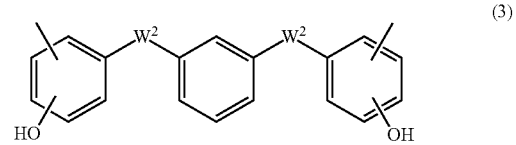

wherein $W^1$ and $W^2$ are each independently $CR^1R^2$ ($R^1$ and $R^2$ each independently represent a hydrogen atom or an alkyl group having 1 to 10 carbon atoms, which may be substituted with a halogen atom (provided that these groups may together form a ring)), C=O, S, SO, or $SO_2$;

2. The triazine-ring-containing polymer according to 1, wherein the $W^1$ and $W^2$ each independently represent $CR^1R^2$ ($R^1$ and $R^2$ each independently represent a hydrogen atom or an alkyl group having 1 to 10 carbon atoms, which may be substituted with a halogen atom), or O;

3. The triazine-ring-containing polymer according to 1 or 2, wherein the Ar is represented by the formula (4);

[Chem. 3]

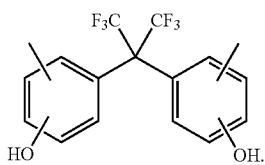

(4)

4. The triazine-ring-containing polymer according to 3, wherein the Ar is represented by the formula (5);

[Chem. 4]

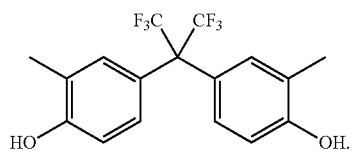

(5)

5. The triazine-ring-containing polymer according to 1 or 2, wherein the Ar is represented by the formula (6) or (7);

[Chem. 5]

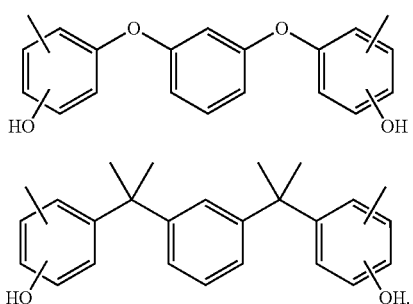

(6)

(7)

6. The triazine-ring-containing polymer according to 5, wherein the Ar is represented by the formula (8) or (9);

[Chem. 6]

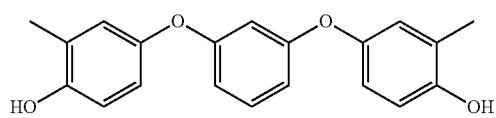

(8)

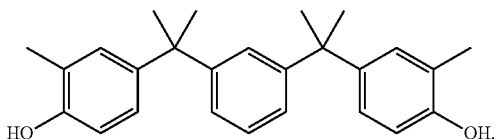

(9)

7. A triazine-based polymer-containing composition including the triazine-ring-containing polymer according to any of claims 1 to 6 and an organic solvent;

8. The triazine-based polymer-containing composition according to 7, further including a crosslinking agent;

9. The triazine-based polymer-containing composition according to 8, wherein the crosslinking agent is a polyfunctional (meth)acrylic compound;

10. A film obtained from the triazine-based polymer-containing composition according to any of 7 to 9;

11. A pattern prepared from the triazine-based polymer-containing composition according to 8 or 9;

12. An electronic device including: a substrate; and the film according to 10, formed on the substrate;

13. An optical member including: a substrate; and the film according to 10, formed on the substrate; and 14. An electronic device including: a substrate; and the pattern according to 11, formed on the substrate.

Advantageous Effects of Invention

According to the present invention, a thin film with a high refractive index and excellent lightfastness can be formed, and a fine pattern can be formed by masking, exposing and curing, followed by alkali development or the like.

In addition, this triazine-ring-containing polymer is combined with various crosslinking agents, thereby making it possible to prepare a cured film which has excellent lightfastness and heat yellowing resistance while maintaining a high refractive index.

The cured film and fine pattern prepared from the composition of the present invention, can achieve with a crosslinked triazine-ring-containing polymer, the properties of high lightfastness, high heat resistance, high refractive index, and low volume shrinkage, and thus can be suitably used in the fields of electronic devices and optical materials, for example, as a member for preparing liquid crystal displays, organic electroluminescence (EL) displays, touch panels, optical semiconductor (LED) elements, solid-state imaging devices, organic thin-film solar cells, dye-sensitized solar cells, organic thin-film transistors (TFTs), lenses, prisms, cameras, binoculars, microscopes, and semiconductor exposure apparatuses.

In particular, the cured films and fine patterns prepared from the composition of the present invention are in high transparency, and high in refractive index, thus making it possible to improve the visibility of transparent conductive films such as ITO and silver nanowires, and making it possible to suppress deterioration of the transparent conductive films.

In addition, the high refractive index pattern prepared from the composition of the present invention can be suitably used for intended uses that requires a high refractive index pattern, including the use for preventing the transparent electrode bone of the above-described touch panel or the like from appearing, the use for light extraction from the organic EL display, and the use for a black matrix.

DESCRIPTION OF EMBODIMENTS

Figure 1:
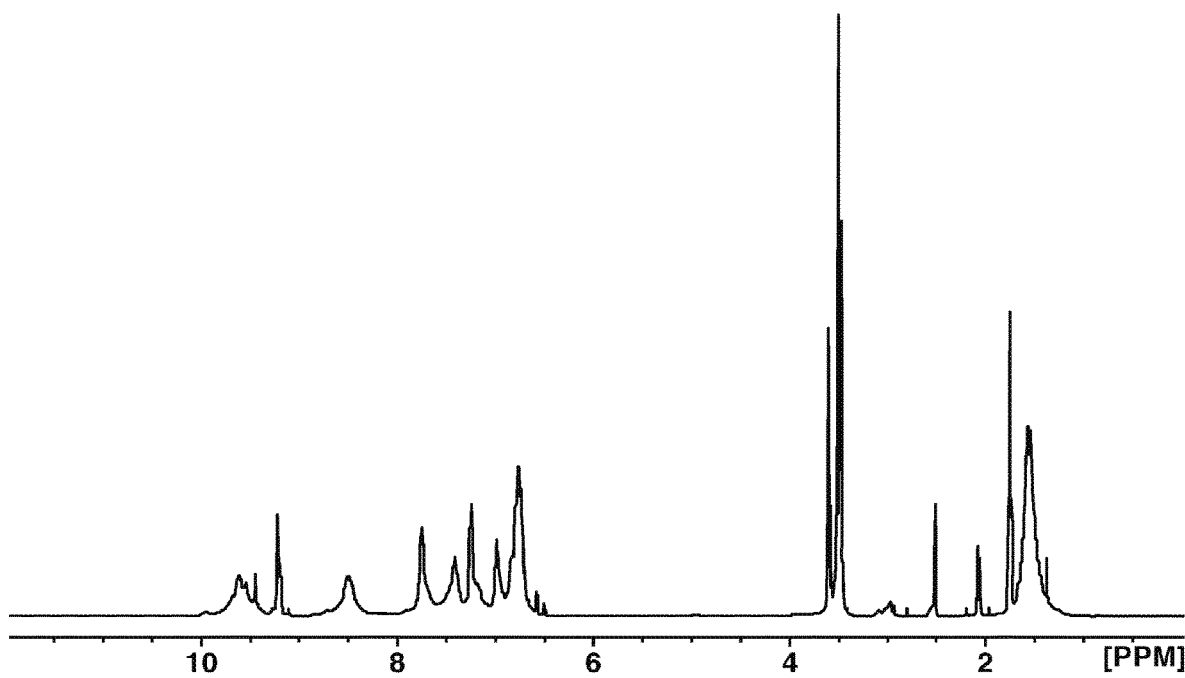
FIG. 1 is a ¹H-NMR spectrum of a polymer compound [3] obtained in Example 1-1.

The present invention will be described in more detail below.

The triazine-ring-containing polymer according to the present invention includes a repeating unit structure represented by the following formula (1).

[Chem. 7]

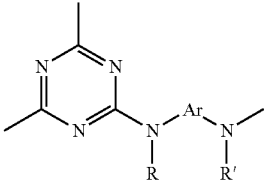

(1)

In the above formula, R and R' each independently represent a hydrogen atom, an alkyl group, an alkoxy group, an aryl group, or an aralkyl group, but from the viewpoint of further increasing the refractive index, both are preferably hydrogen atoms.

In the present invention, the number of carbon atoms in the alkyl group is not to be considered particularly limited, but is preferably 1 to 20, and more preferably 1 to 10, even more preferably 1 to 3 in consideration of further increasing the heat resistance of the polymer. Further, the structure may have any shape of a chain, a branch, and a ring.

Specific examples of the alkyl group include methyl, ethyl, n-propyl, isopropyl, cyclopropyl, n-butyl, isobutyl, s-butyl, t-butyl, cyclobutyl, 1-methyl-cyclopropyl, 2-methyl-cyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methyl-cyclobutyl, 2-methyl-cyclobutyl, 3-methyl-cyclobutyl, 1,2-dimethyl-cyclopropyl, 2,3-dimethyl-cyclopropyl, 1-ethyl-cyclopropyl, 2-ethyl-cyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methyl-cyclopentyl, 2-methyl-cyclopentyl, 3-methyl-cyclopentyl, 1-ethyl-cyclobutyl, 2-ethyl-cyclobutyl, 3-ethyl-cyclobutyl, 1,2-dimethyl-cyclobutyl, 1,3-dimethyl-cyclobutyl, 2,2-dimethyl-cyclobutyl, 2,3-dimethyl-cyclobutyl, 2,4-dimethyl-cyclobutyl, 3,3-dimethyl-cyclobutyl, 1-n-propyl-cyclopropyl, 2-n-propyl-cyclopropyl, 1-isopropyl-cyclopropyl, 2-isopropyl-cyclopropyl, 1,2,2-trimethyl-cyclopropyl, 1,2,3-trimethyl-cyclopropyl, 2,2,3-trimethyl-cyclopropyl, 1-ethyl-2-methyl-cyclopropyl, 2-ethyl-1-methyl-cyclopropyl, 2-ethyl-2-methyl-cyclopropyl, and 2-ethyl-3-methyl-cyclopropyl group.

The number of carbon atoms in the alkoxy group is not to be considered particularly limited, but is preferably 1 to 20, and more preferably 1 to 10, even more preferably 1 to 3 in consideration of further increasing the heat resistance of the polymer. Further, the structure of the alkyl moiety may have any shape of a chain, a branch, and a ring.

Specific examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy, and 1-ethyl-2-methyl-n-propoxy group.

The number of carbon atoms in the aryl group is not to be considered particularly limited, but is preferably 6 to 40, and more preferably 6 to 16, even more preferably 6 to 13 in consideration of further increasing the heat resistance of the polymer.

Specific examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl, and 9-phenanthryl group.

The number of carbon atoms in the aralkyl group is not to be considered particularly limited, but is preferably 7 to 20, and the alkyl moiety thereof may have any shape of a straight chain, a branch and a ring.

Specific examples thereof include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl, and α-naphthylmethyl group.

Ar represents at least one selected from the group represented by the formulas (2) and (3), and preferably represents at least one selected from the group represented by the formulas (2') and (3').

[Chem. 8]

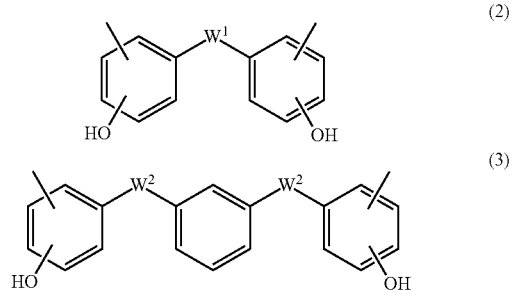

(2)

(3)

[Chem. 9]

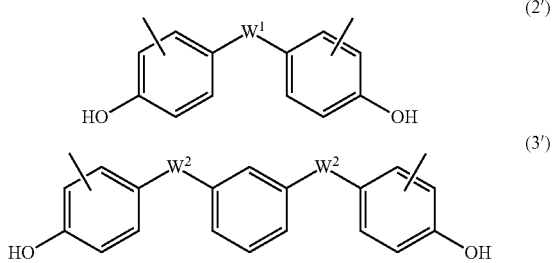

(2')

(3')

$W^1$ and $W^2$ each independently represent $CR^1R^2$ ($R^1$ and $R^2$ each independently represent a hydrogen atom or an alkyl group having 1 to 10 carbon atoms, which may be substituted with a halogen atom (provided that these groups may together form a ring)), C=O, S, SO, or $SO_2$, but are preferably, in particular, $CR^1R^2$ ($R^1$ and $R^2$ each independently represent a hydrogen atom or an alkyl group having 1 to 10 carbon atoms, which may be substituted with a halogen atom), or O.

Examples of the halogen atom include a fluorine atom, a chlorine atom, a bromine atom, and an iodine atom, and a fluorine atom is preferred.

The alkyl group having 1 to 10 carbon atoms may have any shape of a straight chain, a branch, and a ring, examples of the group include straight-chain or branched alkyl groups having 1 to 10 carbon atoms such as methyl, ethyl, n-propyl, isopropyl, n-butyl, isobutyl, s-butyl, t-butyl, n-pentyl, n-hexyl, n-heptyl, n-octyl, n-nonyl, and n-decyl groups; and cyclic alkyl groups having 3 to 10 carbon atoms such as cyclopropyl, cyclobutyl, cyclopentyl, cyclohexyl, cycloheptyl, cyclooctyl, cyclononyl, cyclodecyl, bicyclobutyl, bicyclopentyl, bicyclohexyl, bicycloheptyl, bicyclooctyl, bicyclononyl, and bicyclodecyl, and alkyl groups having 1 to 8 carbon atoms are preferred, and alkyl groups having 1 to 5 carbon atoms are more preferred.

Specific examples of the alkyl group substituted with a halogen atom include an alkyl group having 1 to 10 carbon atoms, where at least one hydrogen atom of the group is substituted with a halogen atom.

Specific examples thereof include a fluoromethyl group, a difluoromethyl group, a trifluoromethyl group, a pentafluoroethyl group, 2,2,2-trifluoroethyl group, a heptafluoropropyl group, and 2,2,3,3,3-pentafluoropropyl group, 2,2,3,3-tetrafluoropropyl group, 2,2,2-trifluoro-1-(trifluoromethyl)ethyl group, a nonafluorobutyl group, 4,4,4-trifluorobutyl group, an undecafluoropentyl group, 2,2,3,3,4,4,5,5,5-nonafluoropentyl group, 2,2,3,3,4,4,5,5-octafluoropentyl group, a tridecafluorohexyl group, 2,2,3,3,4,4,5,5,6,6,6-undecafluorohexyl group, 2,2,3,3,4,4,5,5,6,6-decafluorohexyl group, and 3,3,4,4,5,5,6,6,6-nonafluorohexyl group.

In particular, Ar is, from the viewpoint of improving the solubility of the obtained thin film or cured film in an alkali developer, preferably at least one represented by the formulas (4), (6), and (7), more preferably at least one represented by the formulas (4'), (6'), and (7'), even more preferably at least one represented by the formulas (5), (8), and (9), but not limited thereto.

[Chem. 10]

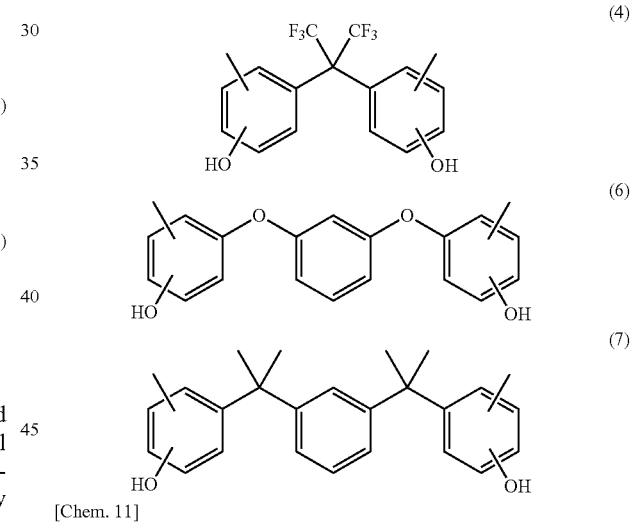

(4)

(6)

(7)

[Chem. 11]

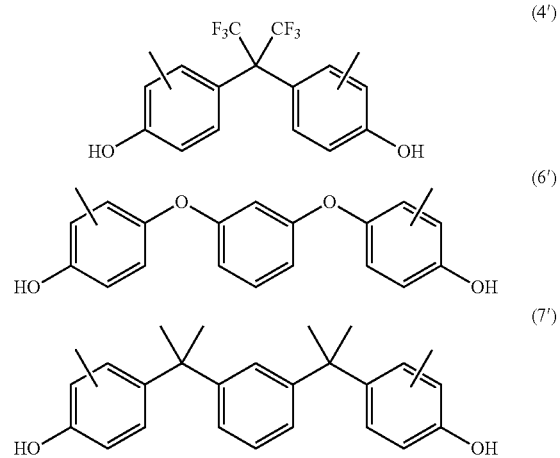

(4')

(6')

(7')

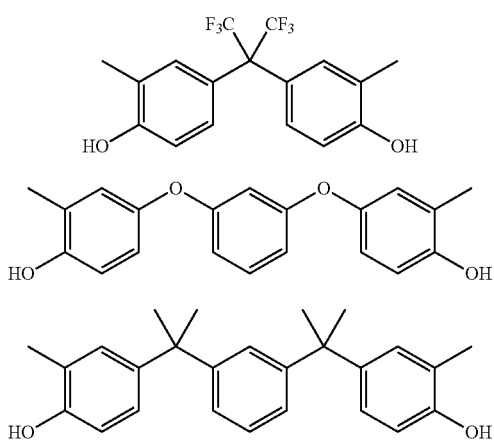

The weight average molecular weight of the polymer in the present invention is not to be considered particularly limited, but is preferably from 500 to 500,000, more preferably from 500 to 100,000, preferably 2,000 or more from the viewpoint of further improving heat resistance and lowering the shrinkage ratio, and preferably 50,000 or less, more preferably 30,000 or less, even more preferably 10,000 or less from the viewpoint of further increasing the solubility and decreasing the viscosity of the obtained solution.

It is to be noted that the weight average molecular weight in the present invention is an average molecular weight obtained by gel permeation chromatography (hereinafter, referred to as GPC) analysis in terms of standard polystyrene.

The triazine-ring-containing polymer (hyperbranched polymer) of the present invention can be produced in accordance with the approach disclosed in Patent Document 1 as described above.

For example, as shown by the following scheme 1, a triazine-ring-containing polymer (12) can be obtained by reacting a triazine compound (10) and an aryldiamino compound (11) in an appropriate organic solvent.

Scheme 1

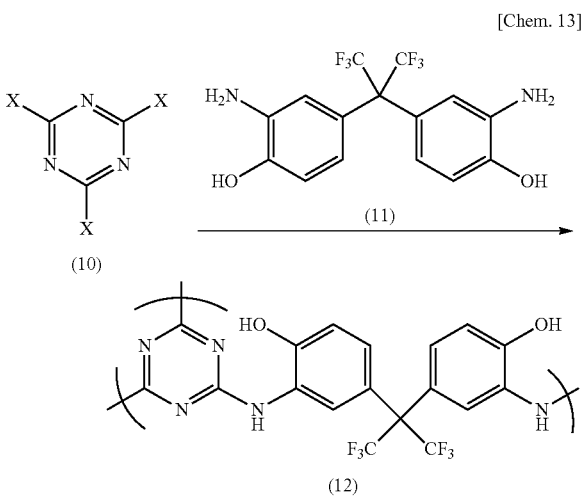

(In the formula, X each independently represents a halogen atom.)

In the above reaction, the preparation ratio of the aryldiamino compound (11) is arbitrary as long as the target polymer can be obtained, but the diamino compound (11) is preferably 0.01 to 10 equivalents per equivalent of the triazine compound (10), more preferably 1 to 5 equivalents.

The aryldiamino compound (11) may be added as a neat compound or as a solution of the compound dissolved in an organic solvent, but the latter approach is preferred in consideration of ease of operation and reaction control.

The reaction temperature may be appropriately set within the range from the melting point of the solvent used to the boiling point of the solvent, but is, in particular, preferably about −30 to 150° C., more preferably −10 to 100° C.

As the organic solvent, various solvents commonly used in this type of reaction can be used, and include tetrahydrofuran, dioxane, and dimethylsulfoxide; and amide-based solvents N,N-dimethylformamide, N-methyl-2-pyrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutylamide, N-methylformamide, and N,N'-dimethylpropyleneurea, and mixed solvents thereof.

Among the solvents, N, N-dimethylformamide, dimethylsulfoxide, N-methyl-2-pyrrolidone, N,N-dimethylacetamide, and a mixed system thereof are preferred, and in particular, N,N-dimethylacetamide and N-methyl-2-pyrrolidone are preferred.

In addition, in the reaction of the above scheme 1, various bases commonly used during or after the polymerization may be added.

Specific examples of the bases include potassium carbonate, potassium hydroxide, sodium carbonate, sodium hydroxide, sodium hydrogen carbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, n-propylamine, trimethylamine, triethylamine, diisopropylamine, diisopropylethylamine, N-methylpiperidine, 2,2,6,6-tetramethyl-N-methylpiperidine, pyridine, 4-dimethylaminopyridine, and N-methylmorpholine.

The additive amount of the bases is preferably 1 to 100 equivalents, more preferably 1 to 10 equivalents, per 1 equivalent of the triazine compound (10). It is to be noted that these bases may be used in the form of an aqueous solution.

No raw material components preferably remain in the obtained polymer, but some raw materials may remain as long as the advantageous effects of the present invention are not impaired.

After completion of the reaction, the product can be easily purified by a reprecipitation method or the like.

It is to be noted that in the present invention, the halogen atom of at least one terminal triazine ring may be partially capped with an alkyl, aralkyl, aryl, alkylamino, alkoxysilyl group-containing alkylamino, aralkylamino, arylamino, alkoxy, aralkyloxy, aryloxy, an ester group, or the like.

Among these groups, alkylamino, alkoxysilyl group-containing alkylamino, aralkylamino, and arylamino groups are preferred, alkylamino and arylamino groups are more preferred, and arylamino groups are even more preferred.

Examples of the alkyl group, alkoxy group, aryl group, and aralkyl group include the same groups as described above.

Specific examples of the ester group include methoxycarbonyl and ethoxycarbonyl groups.

Specific examples of the alkylamino group include methylamino, ethylamino, n-propylamino, isopropylamino, n-butylamino, isobutylamino, s-butylamino, t-butylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino, and 1-ethyl-2-methyl-n-propylamino groups.

Specific examples of the aralkylamino group include benzylamino, methoxycarbonylphenylmethylamino, ethoxycarbonylphenylmethylamino, p-methylphenylmethylamino, m-methylphenylmethylamino, o-ethylphenylmethylamino, m-ethylphenylmethylamino, p-ethylphenylmethylamino, 2-propylphenylmethylamino, 4-isopropylphenylmethylamino, 4-isobutylphenylmethylamino, naphthylmethylamino, methoxycarbonylnaphthylmethylamino, and ethoxycarbonylnaphthylmethylamino groups.

Specific examples of the arylamino group include phenylamino, methoxycarbonylphenylamino, ethoxycarbonylphenylamino, naphthylamino, methoxycarbonylnaphthylamino, ethoxycarbonylnaphthylamino, anthranylamino, pyrenylamino, biphenylamino, terphenylamino, and fluorenylamino groups.

The alkoxysilyl group-containing alkylamino group may be any of monoalkoxysilyl group-containing alkylamino, dialkoxysilyl group-containing alkylamino, and trialkoxysilyl group-containing alkylamino groups, and specific examples thereof include 3-trimethoxysilylpropylamino, 3-triethoxysilylpropylamino, 3-dimethylethoxysilylpropylamino, 3-methyldiethoxysilylpropylamino, N-(2-aminoethyl)-3-dimethylmethoxysilylpropylamino, N-(2-aminoethyl)-3-methyldimethoxysilylpropylamino, and N-(2-aminoethyl)-3-trimethoxysilylpropylamino groups.

Specific examples of the aryloxy group include phenoxy, naphthoxy, anthranyloxy, pyrenyloxy, biphenyloxy, terphenyloxy, and fluorenyloxy groups.

Specific examples of the aralkyloxy group include benzyloxy, p-methylphenylmethyloxy, m-methylphenylmethyloxy, o-ethylphenylmethyloxy, m-ethylphenylmethyloxy, p-ethylphenylmethyloxy, 2-propylphenylmethyloxy, 4-isopropylphenylmethyloxy, 4-isobutylphenylmethyloxy, and α-naphthylmethyloxy groups.

These groups can be easily introduced by substituting the halogen atom on the triazine ring with a compound that provides the corresponding substituent, and for example, as shown in the following scheme 2, an aniline derivative is added to develop a reaction, thereby providing a hyperbranched polymer (13) having a phenylamino group at least one terminal.

Scheme 2

[Chem. 14]

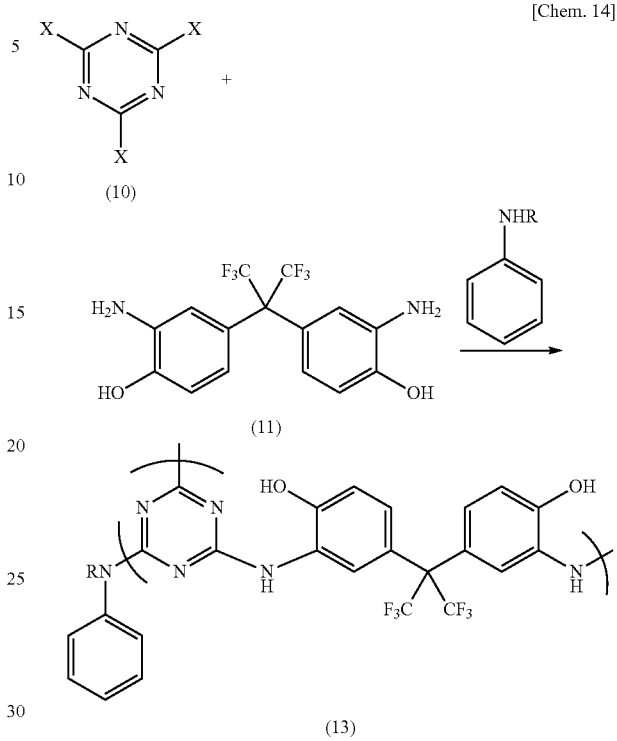

(In the formula, X and R represent the same meanings as described above.)

In this regard, with the organic monoamine simultaneously prepared, that is, in the presence of the organic monoamine, the cyanuric halide compound and the diaminoaryl compound are reacted, thereby making it possible to obtain a soft hyperbranched polymer with a reduced degree of branching, which has rigidity reduced.

Any of an alkyl monoamine, an aralkyl monoamine, and an aryl monoamine can be used as the organic monoamine herein.

Examples of the alkyl monoamine include methylamine, ethylamine, n-propylamine, isopropylamine, n-butylamine, isobutylamine, s-butylamine, t-butylamine, n-pentylamine, 1-methyl-n-butylamine, 2-methyl-n-butylamine, 3-methyl-n-butylamine, 1,1-dimethyl-n-propylamine, 1,2-dimethyl-n-propylamine, 2,2-dimethyl-n-propylamine, 1-ethyl-n-propylamine, n-hexylamine, 1-methyl-n-pentylamine, 2-methyl-n-pentylamine, 3-methyl-n-pentylamine, 4-methyl-n-pentylamine, 1,1-dimethyl-n-butylamine, 1,2-dimethyl-n-butylamine, 1,3-dimethyl-n-butylamine, 2,2-dimethyl-n-butylamine, 2,3-dimethyl-n-butylamine, 3,3-dimethyl-n-butylamine, 1-ethyl-n-butylamine, 2-ethyl-n-butylamine, 1,1,2-trimethyl-n-propylamine, 1,2,2-trimethyl-n-propylamine, 1-ethyl-1-methyl-n-propylamine, 1-ethyl-2-methyl-n-propylamine, and 2-ethylhexylamine.

Specific examples of the aralkyl monoamine include benzylamine, p-methoxycarbonylbenzylamine, p-ethoxycarbonylphenylbenzyl, p-methylbenzylamine, m-methylbenzylamine, and o-methoxybenzylamine.

Specific examples of aryl monoamines include aniline, p-methoxycarbonylaniline, p-ethoxycarbonylaniline, p-methoxyaniline, 1-naphthylamine, 2-naphthylamine, anthranylamine, 1-aminopyrene, 4-biphenylylamine, o-phenylaniline, 4-amino-p-terphenyl, and 2-aminofluorene.

In this case, the usage of the organic monoamine is preferably 0.05 to 500 equivalents, more preferably 0.05 to 120 equivalents, even more preferably 0.05 to 50 equivalents with respect to the cyanuric halide compound.

In addition, the reaction temperature is preferably 60 to 150° C., more preferably 80 to 150° C., even more preferably 80 to 120° C., from the viewpoint of reducing the linearity and increasing the degree of branching.

In addition, the reaction of reacting the cyanuric halide compound and the diaminoaryl compound in the presence of the organic monoamine may be developed with the use of the same organic solvent as described above.

The above-described triazine-ring-containing polymer of the present invention can be suitably used alone or together with a crosslinking agent, as a composition for film formation or a composition for pattern formation.

The crosslinking agent is not to be considered particularly limited as long as the crosslinking agent is a compound having a substituent capable of reacting with the above-described triazine-ring-containing polymer.

Examples of such a compound include a melamine-based compound having a cross-linking substituent such as a methylol group and a methoxymethyl group, a substituted urea compound, a compound containing a cross-linking substituent such as an epoxy group or an oxetane group, and a compound containing a blocked isocyanate, a compound having an acid anhydride, a compound having a (meth)acrylic group, and a phenoplast compound, and from the viewpoint of heat resistance and storage stability, compounds containing an epoxy group, a blocked isocyanate group, or a (meth)acrylic group are preferred, in particular, compounds having a blocked isocyanate group, and polyfunctional epoxy compounds and/or polyfunctional (meth)acrylic compounds that provide a photocurable composition without using any initiator are preferred.

It is to be noted that these compounds may have at least one cross-linking substituent in the case of using the compounds for terminally processing the polymer, and there is a need for the compounds to have at least two cross-linking substituents in the case of using the compounds for cross-linking between polymers.

The polyfunctional epoxy compound is not to be considered particularly limited, as long as the compound has two or more epoxy groups in one molecule.

Specific examples thereof include tris(2,3-epoxypropyl) isocyanurate, 1,4-butanediol diglycidyl ether, 1,2-epoxy-4-(epoxyethyl) cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexanecarboxylate, trimethylolethane triglycidyl ether, bisphenol-A-diglycidyl ether, and pentaerythritol polyglycidyl ether.

Furthermore, as commercially available products, epoxy resins having at least two epoxy groups, YH-434, YH434L (manufactured by Tohto Kasei Co., Ltd.), epoxy resins having a cyclohexene oxide structure, Epolead GT-401, GT-403, GT-301, and GT-302, Celloxide 2021 and 3000 (manufactured by DAICEL CHEMICAL INDUSTRIES, LTD.), bisphenol A-type epoxy resins, jER1001, 1002, 1003, 1004, 1007, 1009, 1010, and 828 (all manufactured by Mitsubishi Chemical Corporation), bisphenol F-type epoxy resin, jER807 (manufactured by Mitsubishi Chemical Corporation), phenol novolac-type epoxy resins, jER152 and 154 (all manufactured by Mitsubishi Chemical Corporation), EPPN 201 and 202 (all manufactured by Nippon Kayaku Co., Ltd.), cresol novolac-type epoxy resins, EOCN-102, 103S, 1045, 1020, 1025, and 1027 (all manufactured by Nippon Kayaku Co., Ltd.), jER180S75 (Mitsubishi Chemical Corporation), an alicyclic epoxy resin, Denacol EX-252 (manufactured by Nagase ChemteX Corporation), CY175, CY177, and CY179 (all manufactured by CIBA-GEIGY A.G), Araldite CY-182, CY-192, and CY-184 (all manufactured by CIBA-GEIGY A.G), EPICLON 200 and 400 (all manufactured by DIC Corporation), jER871 and 872 (all manufactured by Mitsubishi Chemical Corporation), ED-5661 and ED-5662 (all manufactured by Celanese Coatings Company), aliphatic polyglycidyl ethers, Denacol EX-611, EX-612, EX-614, EX-622, EX-411, EX-512, EX-522, EX-421, EX-313, EX-314, and EX-321 (manufactured by Nagase ChemteX Corporation), and the like can also be used.

The polyfunctional (meth)acrylic compound is not to be considered particularly limited, as long as the compound has two or more (meth)acrylic groups in one molecule.

Specific examples thereof include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerin triacrylate, ethoxylated glycerin trimethacrylate, ethoxylated pentaerythritol tetraacrylate, ethoxylated pentaerythritol tetramethacrylate, ethoxylated dipentaerythritol hexaacrylate, polyglycerin monoethylene oxide polyacrylate, polyglycerin polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate, 1,6-hexanediol dimethacrylate, and polybasic acid-modified acrylic oligomers.

In addition, the polyfunctional (meth)acrylic compound is available as a commercially available product, and specific examples thereof include NK esters A-200, A-400, A-600, A-1000, and A-9300 (tris(2-acryloyloxyethyl) isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, AT-20E, ATM-4E, ATM-35E, A-DPH, A-TMPT, A-DCP, A-HD-N, TMPT, DCP, NPG, HD-N, A-DPH-48E, A-DPH-96E, NK Oligo U-15HA, NK Polymer Vanaresin GH-1203 (all manufactured by Shin-Nakamura Chemical Co., Ltd.), KAYARAD (registered trademark) DPHA, NPGDA, PET30, DPEA-12, PEG400DA, THE-330, RP-1040, and DN-0075 (all manufactured by Nippon Kayaku Co., Ltd.), and Aronix M-210, M-303, M-305, M-306, M-309, M-306, M-310, M-313, M-315, M-321, M-350, M-360, M-400, M-402, M-403, M-404, M-405, M-406, M-408, M-450, M-452, and M-460 (all manufactured by Toagosei Co., Ltd.), and DPGDA, HDDA, TPGDA, HPNDA, PETIA, PETRA, TMPTA, TMPEOTA, EBECRYLI1, 40, 135, 140, 145, 150, 180, 1142, 204, 205, 210, 215, 220, 230, 244, 245, 265, 270, 280/1513, 284, 294/25HD, 303, 436, 438, 446, 450, 524, 525, 600, 605, 645, 648, 767, 770, 800, 810, 811, 812, 846, 851, 852, 853, 860, 884, 885, 1259, 1290, 1606, 1830, 1870, 3500, 3603, 3608, 3700, 3701, 3702, 3703, 3708, 4820, 4858, 5129, 6040, 8210, 8454, 8301R, 8307, 8311, 8402, 8405, 8411, 8465, 8701, 8800, 8804, 8807, 9270, 9227EA, 936, KRM8200, 8200AE, 7735, 8296, 08452, 8904, 8528 and 8912, OTA480, IRR214-K, 616, 679, 742, 793, PEG400DA-D (ACA) Z200M, Z230AA, Z250, Z251, Z300, Z320, and Z254F (Daicel Ornex Co., Ltd.).

The above-mentioned polybasic acid-modified acrylic oligomer is also available as a commercially available product, and specific examples thereof include Aronix M-510 and 520 (all manufactured by Toagosei Co., Ltd.).

The acid anhydride compound is not to be considered particularly limited, as long as the compound is a carboxylic anhydride obtained by dehydrating and condensing two molecules of carboxylic acid, and specific examples thereof include compounds having one acid anhydride group in the molecules, such as phthalic anhydride, tetrahydrophthalic anhydride, hexahydrophthalic anhydride, methyltetrahydrophthalic anhydride, methylhexahydrophthalic anhydride, nadic anhydride, methylnadic anhydride, maleic anhydride, succinic anhydride, octyl succinic anhydride, and dodecenyl succinic anhydride; and compounds having two acid anhydride groups in the molecules, such as 1,2,3,4-cyclobutanetetracarboxylic dianhydride, pyromellitic anhydride, 3,4-dicarboxy-1,2,3,4-tetrahydro-1-naphthalene succinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride, and 1,3-dimethyl-1,2,3,4-cyclobutanetetracarboxylic dianhydride.

The compound containing a blocked isocyanate is not to be considered particularly limited, as long as the compound has, in one molecule, two or more blocked isocyanate groups with an isocyanate group (—NCO) blocked by an appropriate protective group, and as long as, if the compound is exposed to a high temperature during thermal curing, the protective group (block moiety) is released by thermal dissociation to cause the produced isocyanate group to develop a crosslinking reaction with the resin, and examples of the compound include compounds having, in one molecule, two or more groups represented by the following formula (these groups may be identical or different).

[Chem. 15]

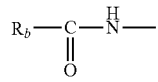

(In the formula, $R_b$ represents an organic group.)

Such a compound can be obtained, for example, by reacting a compound having two or more isocyanate groups in one molecule with a suitable blocking agent.

Examples of the compound having two or more isocyanate groups in one molecule include polyisocyanates such as isophorone diisocyanate, 1,6-hexamethylene diisocyanate, methylenebis(4-cyclohexylisocyanate), and trimethylhexamethylene diisocyanate; dimers and trimers of the polyisocyanates; and products of reactions between the polyisocyanates and diols, triols, diamines, or triamines.

Examples of the blocking agent include alcohols such as methanol, ethanol, isopropanol, n-butanol, 2-ethoxyhexanol, 2-N,N-dimethylaminoethanol, 2-ethoxyethanol, and cyclohexanol; phenols such as phenol, o-nitrophenol, p-chlorophenol, and o-, m-, or p-cresol; lactams such as F-caprolactam, oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; and thiols such as dodecanethiol and benzenethiol.

The compound containing a blocked isocyanate is also available as a commercially available product, and specific examples thereof include TAKENATE (registered trademark) B-830, B-815N, B-842N, B-870N, B-874N, B-882N, B-7005, B-7030, B-7075, and B-5010 (all manufactured by Mitsui Chemicals Polyurethanes Inc.), DURANATE (registered trademark) 17B-60PX, TPA-B80E, MF-B60X, MF-K60X, and E402-B80T (all manufactured by Asahi Kasei Chemicals Corporation), Karenz MOI-BM (registered trademark) (all manufactured by Showa Denko K.K.), and TRIXENE BI7950, 7951, 7960, 7961, 7982, 7990, 7991, and 7992 (registered trademark) (all manufactured by Baxenden Chemicals Limited).

The aminoplast compound is not to be considered particularly limited as long as the compound has two or more methoxymethylene groups in one molecule, and examples of the compound include malamine-based compounds, e.g., CYMEL series such as hexamethoxymethylmelamine CYMEL (registered trademark) 303, tetrabutoxymethyl glycol uril CYMEL 1170, tetramethoxymethylbenzoguanamine CYMEL 1123 (all manufactured by Allnex Netherlands B.V.); and NIKALAC series such as methylated melamine resins NIKALAC (registered trademark) MW-30HM, MW-390, MW-100LM, and MX-750LM, methylated urea resins NIKALAC MX-270, MX-280, and MX-290 (all manufactured by SANWA CHEMICAL CO., LTD.).

The oxetane compound is not to be considered particularly limited as long as the compound has two or more oxetanyl groups in one molecule, and examples of the compound include ARON OXETANE (registered trademark) containing an oxetanyl group OXT-221, OX-SQ-H, and OX-SC (all manufactured by Toagosei Co., Ltd.).

The phenoplast compound has two or more hydroxymethylene groups in one molecule, and if the compound is exposed to a high temperature during thermal curing, causes a cross-linking reaction with the polymer of the present invention to proceed through a dehydration condensation reaction.

Examples of the phenoplast compound include 2,6-dihydroxymethyl-4-methylphenol, 2,4-dihydroxymethyl-6-methylphenol, bis(2-hydroxy-3-hydroxymethyl-5-methylphenyl) methane, bis(4-hydroxy-3-hydroxymethyl-5-methylphenyl) methane, 2,2-bis(4-hydroxy-3,5-dihydroxymethylphenyl) propane, bis(3-formyl-4-hydroxyphenyl) methane, bis(4-hydroxy-2,5-dimethylphenyl) formylmethane, and α,α-bis(4-hydroxy-2,5-dimethylphenyl)-4-formyltoluene.

Phenoplast compounds are also available as commercial products, specific examples of which include 26DMPC, 46DMOC, DM-BIPC-F, DM-BIOC-F, TM-BIP-A, BISA-F, BI25X-DF And BI25X-TPA (all manufactured by Asahi Organic Materials Industry Co., Ltd.).

In addition, in the case of laminating a thin film made of the triazine-ring-containing polymer of the present invention on a protective film such as a PET or polyolefin film and irradiating the thin film with light through the protective film, favorable curing ability can be obtained without suffering from oxygen inhibition even in the thin-film laminated film. In this case, since it is necessary to peel the protective film off after curing, it is preferable to use a polybasic acid-modified acrylic oligomer which provides a thin film with favorable peelability.

The crosslinking agents described above may be used alone, or two or more thereof may be used in combination. The usage of the crosslinking agent is preferably 1 to 100 parts by weight per 100 parts by weight of the triazine-ring-containing polymer, but in consideration of the solvent resistance, the lower limit is preferably 2 parts by weight, more preferably 5 parts by weight, and in consideration of controlling the refractive index, the upper limit is preferably 20 parts by weight, more preferably 15 parts by weight.

The composition of the present invention may be blended with an initiator corresponding to each crosslinking agent. It is to be noted that as described above, in the case of using a polyfunctional epoxy compound and/or a polyfunctional (meth)acrylic compound as a crosslinking agent, photocuring proceeds without using any initiator to provide a cured film, and in such a case, an initiator may be used.

In the case of using a polyfunctional epoxy compound as a crosslinking agent, a photoacid generator or a photobase generator can be used.

The photoacid generator may be appropriately selected from known photoacid generators, and for example, onium salt derivatives such as diazonium salts, sulfonium salts, and iodonium salts can be used.

Specific examples thereof include aryldiazonium salts such as phenyldiazonium hexafluorophosphate, 4-methoxyphenyldiazonium hexafluoroantimonate, and 4-methylphenyldiazonium hexafluorophosphate; diaryliodonium salts such as diphenyliodonium hexafluoroantimonate, di(4-methylphenyl) iodonium hexafluorophosphate, and di(4-tert-butylphenyl) iodonium hexafluorophosphate; triaryl sulfonium salts such as triphenylsulfonium hexafluoroantimonate, tris(4-methoxyphenyl) sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide-bishexafluoroantimonate, 4,4'-bis(diphenylsulfonio)phenylsulfide-bishexafluorophosphate, 4,4'-bis[di(β-hydroxyethoxy)phenylsulfonio]phenylsulfide-bishexafluoroantimonate, 4,4'-bis[di(β-hydroxyethoxy)phenylsulfonio]phenylsulfide-bis-hexafluorophosphate, 4-[4'-(benzoyl)phenylthio]phenyl-di(4-fluorophenyl) sulfonium hexafluoroantimonate, and 4-[4'-(benzoyl)phenylthio] phenyl-di(4-fluorophenyl) sulfonium hexafluorophosphate.

For these onium salts, commercially available products may be used, and specific examples thereof can include SAN-AID (registered trademark) SI-60, SI-80, SI-100, SI-60L, SI-80L, SI-100L, and SI-L145, SI-L150, SI-L160, SI-L110, and SI-L147 (all manufactured by SANSHIN CHEMICAL INDUSTRY CO., LTD.), UVI-6950, UVI-6970, UVI-6974, UVI-6990, and UVI-6992 (all manufactured by Union Carbide Corporation), CPI (registered trademark)-100P, CPI-100A, CPI-200K, and CPI-200S (all manufactured by San-Apro Ltd.), Adeka Optomer SP-150, SP-151, SP-170, and SP-171 (all manufactured by ADEKA Corporation), Irgacure (registered trademark) 261 (manufactured by BASF), CI-2481, CI-2624, CI-2639, and CI-2064 (all manufactured by Nippon Soda Co., Ltd.) CD-1010, CD-1011, and CD-1012 (all manufactured by Sartomer), DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103, and BBI-109 (all manufactured by Midori Kagaku Co., Ltd.), PCI-061T, PCI-062T, PCI-020T, and PCI-022T (all manufactured by Nippon Kayaku Co., Ltd.), and IBPF and IBCF (SANWA CHEMICAL CO., LTD.).

On the other hand, the photobase generator may be also appropriately selected for use from known photobase generators, for example, Co-amine complex-based, oxime carboxylate-based, carbamate-based, quaternary ammonium salt-based photobase generators and the like can be used.

Specific examples thereof include 2-nitrobenzyl cyclohexylcarbamate, triphenylmethanol, O-carbamoylhydroxylamide, 0-carbamoyloxime, [[(2,6-dinitrobenzyl)oxy]carbonyl] cyclohexylamine, bis[[(2-nitrobenzyl)oxy]carbonyl] hexane 1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl) pyrrolidine, hexaamminecobalt (III) tris(triphenylmethylborate), 2-benzyl-2-dimethylamino-1-(4-morpholinophenyl)-butanone, 2,6-dimethyl-3,5-diacetyl-4-(2'-nitrophenyl)-1,4-dihydropyridine, and 2,6-dimethyl-3,5-diacetyl-4-(2',4'-dinitrophenyl)-1,4-dihydropyridine.

In addition, for the photobase generators, commercially available products may be used, and specific examples thereof include TPS-OH, NBC-101, and ANC-101 (all product names, manufactured by Midori Kagaku Co., Ltd.).

In the case of using the photoacid or base generator, the generator is preferably used within the range of 0.1 to 15 parts by weight, more preferably within the range of 1 to 10 parts by weight, per 100 parts by weight of the polyfunctional epoxy compound.

Further, if necessary, an epoxy resin curing agent may be blended in an amount of 1 to 100 parts by weight per 100 parts by weight of the polyfunctional epoxy compound.

On the other hand, in the case of using the polyfunctional (meth)acrylic compound, a photo-radical polymerization initiator can be used.

The photo-radical polymerization initiator may be also appropriately selected for use from known photo-radical polymerization initiators, which include acetophenones, benzophenones, Michler's benzoylbenzoate, amiloxime esters, oxime esters, tetramethylthiuram monosulfide, and thioxanthones.

In particular, photo-cleavable photo-radical polymerization initiators are preferred. The photo-cleavable photo-radical polymerization initiator is described in the latest UV curing technology (p. 159, publisher: Kazuhiro Takasuki, publication office: Technical Information Institute Co., Ltd., 1991).

Commercially available photo-radical polymerization initiators include Irgacure (registered trademark) 127, 184, 369, 379, 379EG, 651, 500, 754, 819, 903, 907, 784, 1173, 2959, CGI1700, CGI1750, CGI1850, CG24-61, OXE01, and OXE02, Darocur (registered trademark) 1116, 1173, MBF, Lucirin TPO (all manufactured by BASF), EBECRYL (registered trademark) P36 (manufactured by Cytec Surface Specialties), and ESACURE (registered trademark) KIP150, KIP65LT, KIP100F, KT37, KT55, KT046, and KIP75/B (all manufactured by Lamberti).

In the case of using a photo-radical polymerization initiator, the initiator is preferably used in the range of 0.1 to 200 parts by weight, more preferably in the range of 1 to 150 parts by weight, per 100 parts by weight of the polyfunctional (meth)acrylate compound.

The composition of the present invention is preferably used with the triazine-ring-containing polymer dissolved by adding various solvents thereto.

Examples of the solvent include water, toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl normal butyl ketone, cyclopentanone, cyclohexanone, ethyl acetate, isopropyl acetate, normal propyl acetate, isobutyl acetate, normal butyl acetate, ethyl lactate, methanol, ethanol, isopropanol, tert-butanol, allyl alcohol, normal propanol, 2-methyl-2-butanol, isobutanol, normal butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3-dimethyl-2-imidazolidinone, dimethylsulfoxide, and N-cyclohexyl-2-pyrrolidinone, and these solvents may be used alone, or two or more thereof may be used in mixture.

In this regard, the solid content concentration in the composition is not particularly limited as long as the storage stability is not affected, and may be appropriately set depending on the thickness of the target film. Specifically, from the viewpoints of solubility and storage stability, the solid content concentration is preferably 0.1 to 50% by weight, and more preferably 0.1 to 40% by weight.

The composition of the present invention may include, as long as the advantageous effects of the present invention are not impaired, other components besides the triazine-ring-containing polymer, the crosslinking agent, and the solvent, for example, additives such as leveling agents, surfactants, silane coupling agents, antioxidants, rust inhibitors, release agents, plasticizers, defoamers, thickeners, dispersants, antistatic agents, anti-settling agents, pigments, dyes, ultraviolet absorbers, light stabilizers, and inorganic fine particles.

The surfactants include non-ionic surfactants, e.g., polyoxyethylene alkyl ethers such as polyoxyethylene lauryl ether, polyoxyethylene stearyl ether, polyoxyethylene cetyl ether, and polyoxyethylene oleyl ether; polyoxyethylene alkyl allyl ethers such as polyoxyethylene octyl phenol ether and polyoxyethylene nonyl phenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate, and sorbitan tristearate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate; and fluorine-based surfactants such as the product name EFTOP EF301, EF303, and EF352 (manufactured by Mitsubishi Materials Electronic Chemicals Co., Ltd. (formerly Japan Excel-Management Consulting Co., Ltd.)), MegaFac F171, F173, R-08, R-30, R-40, R-41, F-114, F-410, F-430, F-444, F-477, F-552, F-553, F-554, F-555, F-556, F-557, F-558, F-559, F-561, F-562, RS-75, RS-72-K, RS-76-E, RS-76NS, and RS-77 (manufactured by DIC Corporation), Florard FC430 and FC431 (manufactured by Sumitomo 3M Limited), Asahi Guard AG710, Surflon S-382, SC101, SC102, SC103, SC104, SC105, and SC106 (manufactured by Asahi Glass Co., Ltd.), and organosiloxane polymers KP341 (manufactured by Shin-Etsu Chemical Co., Ltd.), BYK-302, BYK-307 BYK-322, BYK-323, BYK-330, BYK-333, BYK-370, BYK-375, and BYK-378 (manufactured by BYK Japan KK).

These surfactants may be used alone, or two or more thereof may be used in combination. The usage of the surfactant is preferably 0.0001 to 5 parts by weight, more preferably 0.001 to 1 parts by weight, even more preferably 0.01 to 0.5 parts by weight per 100 parts by weight of the triazine-ring-containing polymer.

The inorganic fine particles include oxides, sulfides, or nitrides of one, or two or more metals selected from the group consisting of Be, Al, Si, Ti, V, Fe, Cu, Zn, Y, Zr, Nb, Mo, In, Sn, Sb, Ta, W, Pb, Bi, and Ce, and the metal oxides are particularly preferred. It is to be noted that the inorganic fine particles may be used alone, or two or more thereof may be used in combination.

Specific examples of the metal oxides include $Al_2O_3$, ZnO, $TiO_2$, $ZrO_2$, $Fe_2O_3$, $Sb_2O_5$, BeO, ZnO, $SnO_2$, $CeO_2$, $SiO_2$, and $WO_3$.

It is also effective to use multiple metal oxides as a complex oxide. The complex oxide refers to a mixture of two or more inorganic oxides at the stage of producing fine particles. Examples thereof include complex oxides of. $TiO_2$ and $ZrO_2$; $TiO_2$, $ZrO_2$, and $SnO_2$; and $ZrO_2$ and $SnO_2$.

Furthermore, compounds of the foregoing metals may be adopted. The compounds include $ZnSb_2O_6$, $BaTiO_3$, $SrTiO_3$, and $SrSnO_3$. These compounds can be used alone, or two or more thereof can be used in mixture, and furthermore, the compounds may be used in mixture with the above-mentioned oxides.

Further, the above-mentioned other components can be added in any step for preparing the composition of the present invention.

The composition of the present invention for film formation can be applied to a substrate, and thereafter, if necessary, heated to evaporate the solvent, and then heated or irradiated with light to form a desired cured film.

The method for applying the composition is arbitrary, and for example, methods can be used, such as a spin coating method, a dip method, a flow coating method, an ink-jet method, a jet dispenser method, a spray method, a bar coating method, a gravure coating method, a slit coating method, a roll coating method, a transfer printing method, brush coating, a blade coating method, and an air knife coating method.

In addition, examples of the substrate include substrates made of silicon, glass with an indium tin oxide (ITO) formed, glass with an indium zinc oxide (IZO) formed, polyethylene terephthalate (PET), plastic, glass, quartz, and ceramics, and flexible substrates with flexibility can also be used.

The baking temperature is not particularly limited for the purpose of evaporating the solvent, and the baking can be performed, for example, at 110 to 400° C.

The baking method is not to be considered particularly limited, and for example, the solvent may be evaporated with the use of, for example, a hot plate or an oven under a suitable atmosphere, e.g., the atmosphere, an inert gas such as nitrogen, or a vacuum.

For the baking temperature and the baking time, conditions may be selected, which are suitable for a process step for a target electronic device, and the baking conditions may be selected such that the physical properties of the obtained film conform to the required characteristics of the electronic device.

The conditions in the case of light irradiation are not to be considered particularly limited, and appropriate irradiation energy and time may be employed depending on the triazine-ring-containing polymer and crosslinking agent used.

In addition, in preparing a cured film by irradiating the composition with light, a fine pattern can be also formed by light irradiation through a mask, and then development with a developer.

In this case, development after exposure can be performed, for example, by immersing the exposed resin in an organic solvent developer or an aqueous developer.

Specific examples of the organic solvent developer include PGME, PGMEA, a mixed solvent of PGME and PGMEA, NMP, γ-butyrolactone, and DMSO, and on the other hand, specific examples of the aqueous developer include alkaline aqueous solutions of sodium carbonate, potassium carbonate, sodium hydroxide, potassium hydroxide, tetramethylammonium hydroxide, and the like.

In the case of providing a negative-type composition for pattern formation, the above-mentioned composition may be blended with an oxirane ring-containing compound and a photocurable catalyst.

Examples of the oxirane ring-containing compound include compounds having one or more, preferably two or more oxirane rings in the molecules, and specific examples thereof include glycidyl ether-type epoxy resins, glycidyl ester-type epoxy resins, alicyclic epoxy resins, epoxy-modified polybutadiene resins, and oxetane compounds. These may be used alone, or two or more thereof may be used in combination.

The compounding amount of the oxirane ring-containing compound is not to be considered particularly limited, but can be about 10 to 400 parts by weight per 100 parts by weight of the triazine-ring-containing polymer.

Examples of the photocurable catalyst include a photocation generator. Specific examples of the photocation generator include triarylsulfonium salts such as triphenylsulfonium hexafluorophosphate and triphenylsulfonium hexafluoroantimonate; triarylselenium salts; and diaryliodonium salts such as diphenyliodonium hexafluorophosphate and diphenyliodonium hexafluoroantimonate. These may be used alone, or two or more thereof may be used in combination.

The compounding amount of the photocurable catalyst is not to be considered particularly limited, but can be about 0.1 to 100 parts by weight per 100 parts by weight of the triazine-ring-containing polymer.

The method for preparing the negative-type composition for pattern formation is not to be considered particularly limited, and the composition may be prepared by blending the respective components in an arbitrary order. In addition, in that regard, the above-described solvents may be used.

After applying the above-mentioned composition by the above-described approach, the composition can be cured by, for example, irradiation with ultraviolet light or the like at 1 to 4,000 mJ/cm². The light irradiation may be performed with the use of various types of known approaches such as a high-pressure mercury lamp, a metal halide lamp, a xenon lamp, an LED, and a laser beam.

Further, if necessary, heating may be performed at about 110 to 180° C. before or after the exposure.

Development after the exposure can be performed by immersing the exposed resin in the above-described organic solvent developer or aqueous developer.

On the other hand, in the case of providing a positive-type composition for pattern formation, the above-mentioned composition may be further blended with an azide compound.

As the azide compound, a compound having one or more, preferably two or more 1,2-naphthoquinonediazide groups is preferred, and specific examples thereof include 1,2-naphthoquinonediazidesulfonic acid derivatives such as an ester of 2,3,4-trihydroxy-benzophenone and 1,2-naphthoquinone-(2)-diazido-5-sulfonic acid.

The compounding amount of the azide compound is not to be considered particularly limited, but can be about 4 to 60 parts by weight per 100 parts by weight of the triazine-ring-containing polymer.

The method for preparing the positive-type composition for pattern formation is also not to be considered particularly limited, and the composition may be prepared by blending the respective components in an arbitrary order. In addition, in that regard, the above-described solvents may be used.

After applying the above-mentioned composition by the above-described approach, the composition can be cured by, for example, irradiation with ultraviolet light or the like at 1 to 2,000 mJ/cm² in accordance with the light irradiation method described above. Also in this case, if necessary, heating may be performed at about 110 to 180° C. before or after the exposure.

Development after the exposure can be performed by immersing the exposed resin in the above-described organic solvent developer or aqueous developer.

Various types of additives may be added to each of the above-mentioned compositions for pattern formation, if necessary. Examples of additives include thermal cation generators such as benzyl-4-hydroxyphenylmethylsulfonium hexafluoroantimonate, 1-naphthylmethyl-4-hydroxyphenylmethylsulfonium hexafluoroantimonate, and 4-hydroxyphenyldimethylsulfonium methylsulfate; photosensitizers such as 2,5-diethylthioxanthone, anthracene, and 9,10-ethoxyanthracene; and the additives exemplified in the case of the above-mentioned composition for film formation.

The thus obtained thin film, cured film, and fine pattern of the present invention are capable of achieving high heat resistance, high refractive index, and low volume shrinkage, and thus can be suitably used in the fields of electronic devices and optical materials, for example, as a member for preparing liquid crystal displays, organic electroluminescence (EL) displays, touch panels, optical semiconductor (LED) elements, solid-state imaging devices, organic thin-film solar cells, dye-sensitized solar cells, organic thin-film transistors (TFTs), lenses, prisms, cameras, binoculars, microscopes, and semiconductor exposure apparatuses.

In particular, the thin films, cured films, and fine patterns prepared from the composition of the present invention are in high transparency, and high in refractive index, thus making it possible to improve the visibility of transparent conductive films such as ITO and silver nanowires, and making it possible to suppress deterioration of the transparent conductive films.

As the transparent conductive films, transparent conductive films that have a conductive nanostructure are preferred, such as an ITO film, an IZO film, a metal nanoparticle, a metal nanowire, and a metal nanomesh, and the transparent conductive films that have a conductive nanostructure are more preferred. The metal constituting the conductive nanostructure is not particularly limited, and examples thereof include silver, gold, copper, nickel, platinum, cobalt, iron, zinc, ruthenium, rhodium, palladium, cadmium, osmium, iridium, and alloys thereof. More specifically, transparent conductive films are preferred which have silver nanoparticles, silver nanowires, silver nanomesh, gold nanoparticles, gold nanowires, gold nanomesh, copper nanoparticles, copper nanowires, copper nanomesh, or the like, and in particular, transparent conductive films are preferred which have silver nanowires.

In addition, the high refractive index pattern prepared from the composition of the present invention can be suitably used for intended uses that requires a high refractive index pattern, including the use for preventing the transparent electrode bone of the above-described touch panel or the like from appearing, the use for light extraction from the organic EL display, and the use for a black matrix.

EXAMPLES

The present invention will be more specifically described below with reference to Examples and Comparative Examples, but the present invention is not to be considered limited to the following Examples. Further, here are the measurement apparatuses used in the Examples.

| [¹H-NMR] | |
| --- | --- |
| Apparatus: | BRUKER AVANCEIII HD (500 MHz) |
| Measurement solvent: | DMSO-d6 |
| Reference substance: | tetramethylsilane (TMS) (δ 0.0 ppm) |
| [GPC] | |
| Apparatus: | HLC-8200 GPC manufactured by Tosoh Corporation |
| Column: | TSK-GEL α-3000 + α-4000 manufactured by Tosoh Corporation |
| Column temperature: | 40° C. |
| Solvent: | N,N-dimethylformamide (hereinafter, DMF) |
| Detector: | UV (254 nm) |
| Calibration curve: | standard polystyrene |
| [Ellipsometer] | |
| Apparatus: | multi-incidence angle spectroscopic ellipsometer VASE manufactured by JA Woollam Japan |
| [Differential thermal balance (TG-DTA)] | |
| Apparatus: | TG-8120 manufactured by Rigaku Corporation |
| Temperature increase rate: | 10° C./min |
| Measurement temperature: | 25° C.-750° C. |
| [Lightfastness tester] | |
| Apparatus: | Xenon weather resistance tester Q-SUN Xe-1-BC manufactured by Q-LAB |
| Optical filter: | Window Glass-Q |
| Illuminance: | 0.50 W/cm² (λ = 340 nm) |
| Black panel temperature: | 40° C. |
| [Ultraviolet-visible spectrophotometer] | |
| Apparatus: | Ultraviolet-Visible-Near Infrared spectrophotometer UV-3600 manufactured by Shimadzu Corporation |
| [Optical microscope] | |
| Apparatus: | digital microscope VHX-2000 manufactured by KEYENCE |

[1] Synthesis of Triazine-Ring-Containing Hyperbranched Polymer

[Example 1-1] Synthesis of Polymer Compound [3]

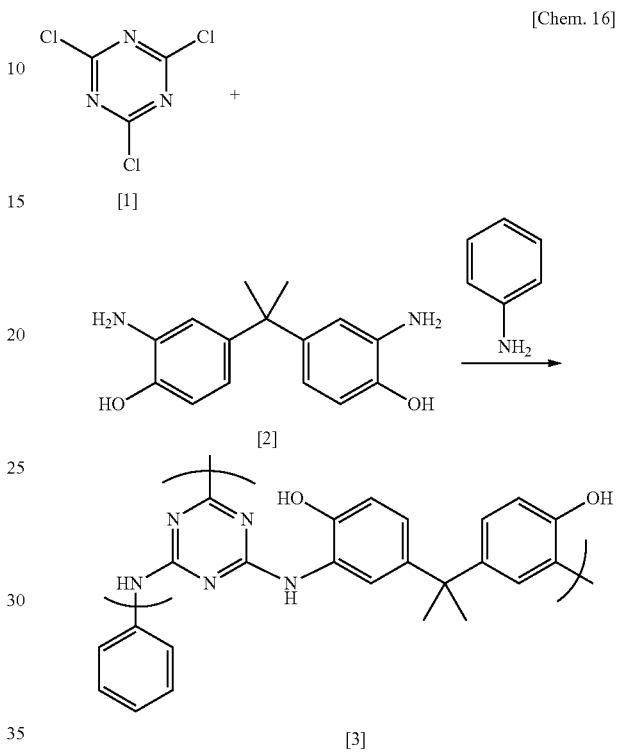

Under nitrogen, into a 100 mL four-necked flask, 2,2-bis (3-amino-4-hydroxyphenyl)-propane [2] (BAPA, 5.68 g, 0.022 mol, manufactured by Wakayama Seika Co., Ltd.) was added, and dissolved in N,N-dimethylacetamide (23.90 g, DMAc, manufactured by JUNSEI CHEMICAL CO., LTD.). Thereafter, the solution was cooled to −10° C. with an ethanol-dry ice bath, and 2,4,6-trichloro-1,3,5-triazine [1] (3.69 g, 0.02 mol, manufactured by Evonik Degussa) was put therein while checking the bath temperature so as not to reach 0° C. or higher. After stirring for 1 hour, the reaction solution was added dropwise into a 200 mL four-necked flask purged with nitrogen, with 23.90 g of DMAc added thereto in advance, and then set at 85° C. in an oil bath. After stirring for 2 hours, aniline (5.59 g, 0.03 mol, manufactured by Tokyo Chemical Industry Co., Ltd.) was added dropwise, and the mixture was stirred for 2 hours. Thereafter, the temperature was lowered to room temperature, n-propylamine (2.73 g, manufactured by Tokyo Chemical Industry Co., Ltd.) was added dropwise, and after stirring for 1 hour, the stirring was stopped. The reaction solution was added dropwise into ion-exchanged water (319 g) to cause reprecipitation. The sediment was filtered, and redissolved in THF (43.42 g). After stirring for 1 hour, the supernatant was removed, and the concentration was adjusted with THF (14.96 g). The solution was added dropwise into ion-exchanged water (359 g) to cause reprecipitation again. The obtained sediment was filtered, and dried in a drying machine under reduced pressure at 120° C. for 6 hours to obtain 9.0 g of the target polymer compound [3] (hereinafter, referred to as HB-TBAPA). FIG. 1 shows the result of measuring a ¹H-NMR spectrum of the HB-TBAPA.

The weight average molecular weight Mw of the HB-TBAPA, measured by GPC in terms of polystyrene, was 3,800, and the polydispersibility Mw/Mn was 2.44. To a platinum pan, 5 mg of the obtained HB-TBAPA was added, and subjected to a measurement at a temperature increase rate of 10° C./min in accordance with a TG-DTA measurement, thereby resulting in a 5% weight loss at 345° C.

[Example 1-2] Synthesis of Polymer Compound [5]

[Chem. 17]

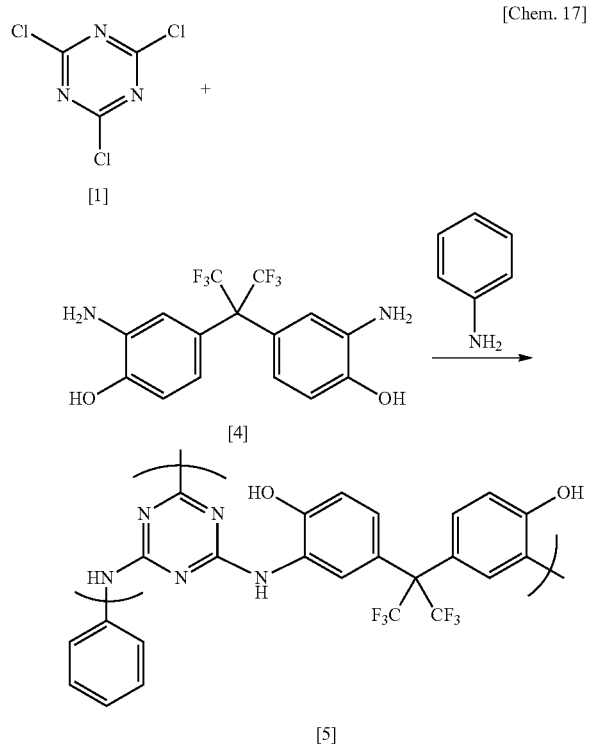

Figure 2:
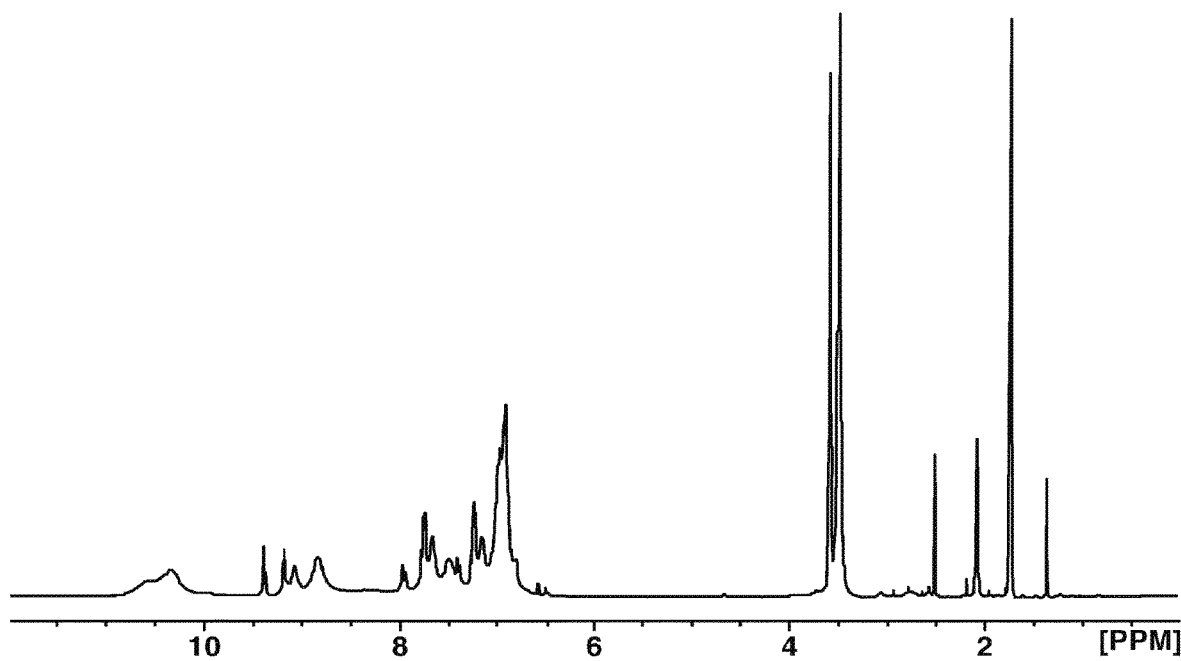
FIG. 2 is a ¹H-NMR spectrum of a polymer compound [5] obtained in Example 1-2.

Under nitrogen, into a 100 mL four-necked flask, 2,2-bis(3-amino-4-hydroxyphenyl)-hexafluoropropane [4] (8.06 g, 0.022 mol, manufactured by Central Glass Co., Ltd.) was added, and dissolved in 29.95 g of DMAc (manufactured by JUNSEI CHEMICAL CO., LTD.). Thereafter, the solution was cooled to −10° C. with an ethanol-dry ice bath, and 2,4,6-trichloro-1,3,5-triazine [1] (3.69 g, 0.02 mol, manufactured by Evonik Degussa) was put therein while checking the bath temperature so as not to reach 0° C. or higher. After stirring for 1 hour, the reaction solution was added dropwise into a 200 mL four-necked flask purged with nitrogen, with 29.95 g of DMAc added thereto in advance, and then set at 85° C. in an oil bath. After stirring for 2 hours, aniline (5.59 g, 0.06 mol, manufactured by Tokyo Chemical Industry Co., Ltd.) was added dropwise, and the mixture was stirred for 2 hours. Thereafter, the temperature was lowered to room temperature, n-propylamine (2.73 g, manufactured by Tokyo Chemical Industry Co., Ltd.) was added dropwise, and after stirring for 1 hour, the stirring was stopped. The reaction solution was added dropwise into ion-exchanged water (399 g) to cause reprecipitation. The sediment was filtered, and redissolved in THF (52.00 g). After stirring for 1 hour, the supernatant was removed, the concentration of the solution was adjusted with THF, and the solution was added dropwise into ion-exchanged water (416 g) to cause reprecipitation again. The obtained sediment was filtered, and dried in a drying machine under reduced pressure at 120° C. for 6 hours to obtain 8.6 g of the target polymer compound [5] (hereinafter, referred to as HB-TFPA). FIG. 2 shows the result of measuring a ¹H-NMR spectrum of the HB-TFPA.

The weight average molecular weight Mw of the HB-TFPA, measured by GPC in terms of polystyrene, was 8,200, and the polydispersibility Mw/Mn was 2.83. To a platinum pan, 5 mg of the obtained HB-TFPA was added, and subjected to a measurement at a temperature increase rate of 10° C./min in accordance with a TG-DTA measurement, thereby resulting in a 5% weight loss at 371° C.

[Comparative Example 1-1] Synthesis of Polymer Compound [7]

[Chem. 18]

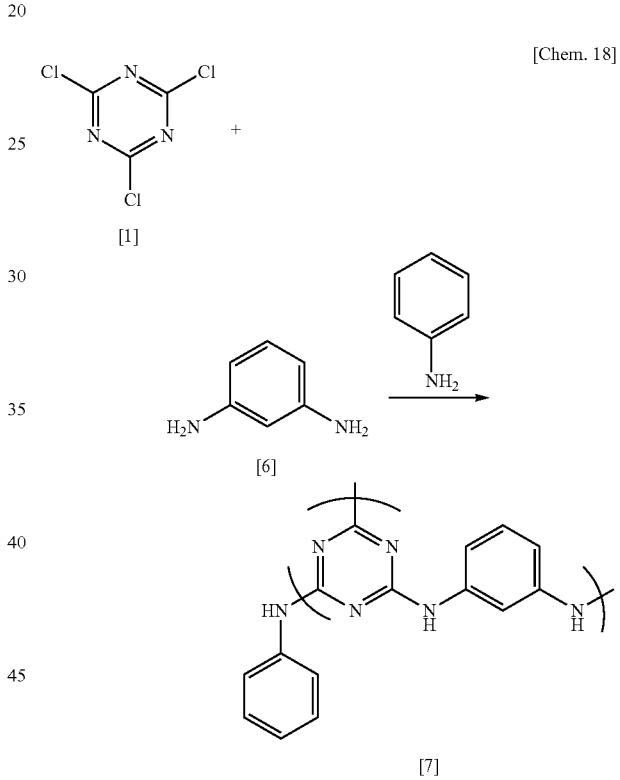

Under nitrogen, to a 1,000 mL four-neck flask, 456.02 g of DMAc was added, and cooled to −10° C. with an acetone-dry ice bath, and 2,4,6-trichloro-1,3,5-triazine [1] (84.83 g, 0.460 mol, manufactured by Evonik Degussa) was added to, and then dissolved in the DMAc. Thereafter, m-phenylenediamine [6] (62.18 g, 0.575 mol) and aniline (14.57 g, 0.156 mol) dissolved in 304.01 g of DMAc were added dropwise. The reaction solution, stirred for 30 minutes after the delivery by drops, was added dropwise over 1 hour through a solution transfer pump into a tank heated to 85° C. in an oil bath in advance, with 621.85 g of DMAc added to a 2,000 mL four-necked flask, and polymerized by stirring for 1 hour.

Figure 3:
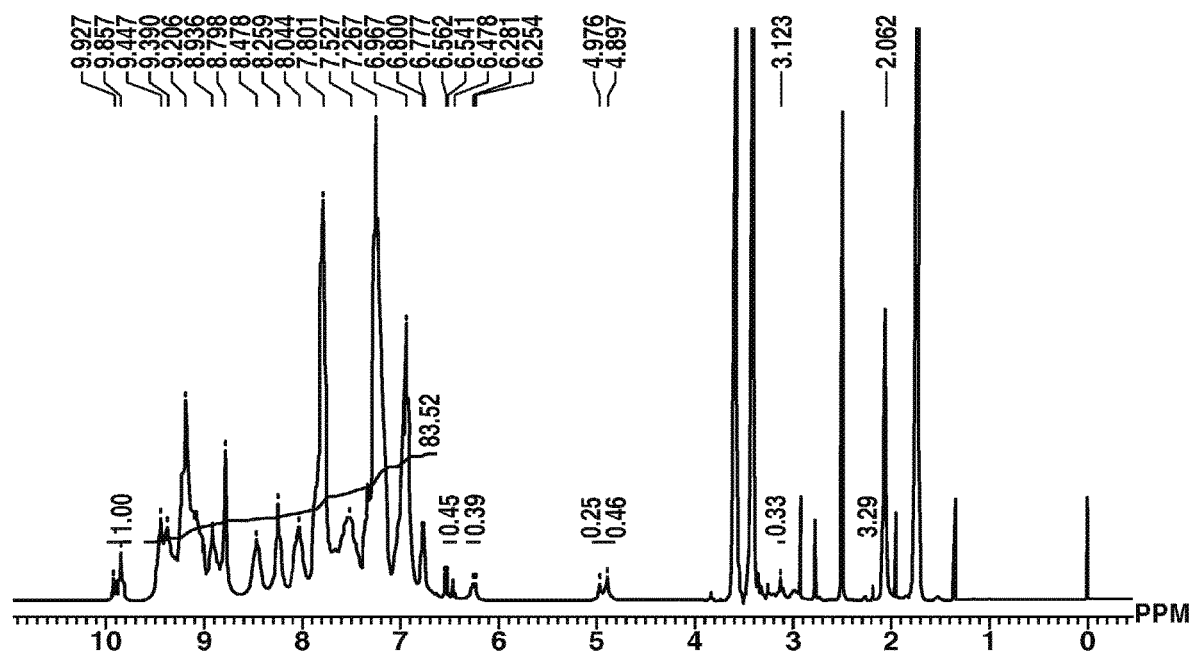
FIG. 3 is a ¹H-NMR spectrum of a polymer compound [7] obtained in Comparative Example 1-1.

Thereafter, aniline (113.95 g, 1.224 mol) was added, and the reaction was terminated after stirring for 1 hour. After cooling to room temperature with an ice bath, triethylamine (116.36 g, 1.15 mol) was added dropwise, and hydrochloric acid was quenched by stirring for 30 minutes. Thereafter, the precipitated hydrochloride was removed by filtration. The filtered reaction solution was reprecipitated in a mixed solution of a 28% by weight aqueous ammonia solution (279.29 g) and ion-exchanged water (8,820 g). The sediment was filtered, dried at 150° C. for 8 hours in a drying machine under reduced pressure, then redissolved in THF (833.1 g), and reprecipitated in ion-exchanged water (6,665 g). The obtained sediment was filtered, and dried in a drying machine under reduced pressure at 150° C. for 25 hours to obtain 118.0 g of the target polymer compound [7] (hereinafter, referred to as HB-TmDA40). FIG. 3 shows the result of measuring a $^1$H-NMR spectrum of the HB-TmDA40.

The weight average molecular weight Mw of the HB-TmDA40, measured by GPC in terms of polystyrene, was 4,300, and the polydispersibility Mw/Mn was 3.44. To a platinum pan, 5 mg of the obtained HB-TmDA40 was added, and subjected to a measurement at a temperature increase rate of 10° C./min in accordance with a TG-DTA measurement, thereby resulting in a 5% weight loss at 419° C.

[Comparative Example 1-2] Synthesis of Polymer Compound [8]

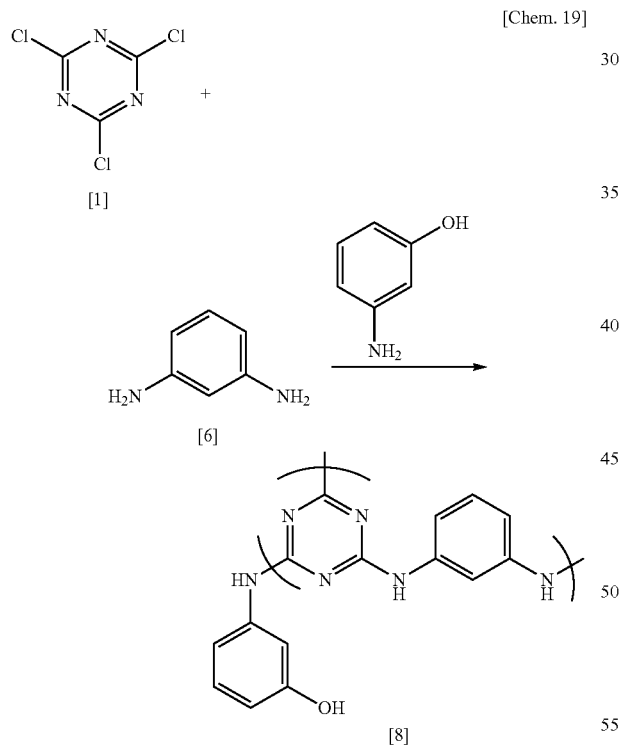

Figure 4:
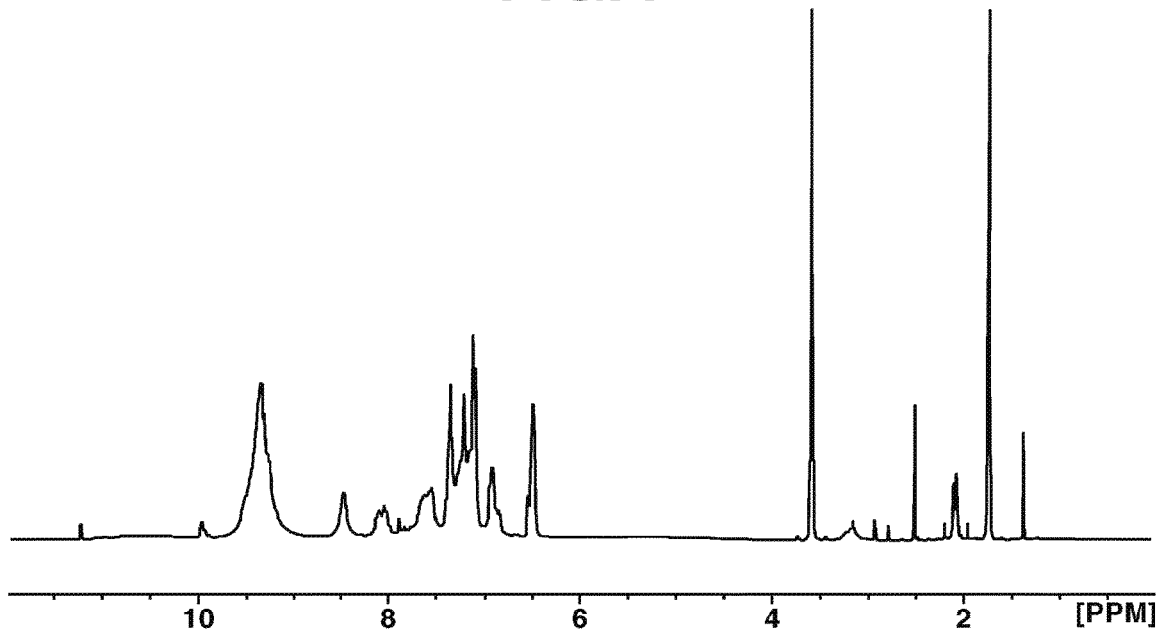
FIG. 4 is a ¹H-NMR spectrum of a polymer compound [8] obtained in Comparative Example 1-2.

Under nitrogen, into a 100 mL four-necked flask, m-phenylenediamine [6] (5.95 g, 0.055 mol, manufactured by AminoChem) was added, and dissolved in 42.98 g of N,N-dimethylacetamide (DMAc, manufactured by JUNSEI CHEMICAL CO., LTD.). Thereafter, the solution was cooled to −10° C. with an ethanol-dry ice bath, and 2,4,6-trichloro-1,3,5-triazine [1] (9.22 g, 0.05 mol, manufactured by Evonik Degussa) was put therein while checking the bath temperature so as not to reach 0° C. or higher. After stirring for 1 hour, the reaction solution was added dropwise into a 200 mL four-necked flask purged with nitrogen, with 42.98 g of DMAc added thereto in advance, and then set at 85° C. in an oil bath. After stirring for 2 hours, 3-aminophenol (16.44 g, 0.15 mol, manufactured by Tokyo Chemical Industry Co., Ltd.) dissolved in 16.44 g of DMAc was added dropwise, and the mixture was stirred for 3 hours. Thereafter, the temperature was lowered to room temperature, n-propylamine (2.97 g, manufactured by Tokyo Chemical Industry Co., Ltd.) was added dropwise, and after stirring for 1 hour, the stirring was stopped. The reaction solution was added dropwise into ion-exchanged water (810.4 g) to cause reprecipitation. The sediment was filtered, and redissolved in THF (94.61 g). After stirring for 1 hour, the supernatant was removed, and the solution was added dropwise into ion-exchanged water (756.9 g) to cause reprecipitation again. The obtained sediment was filtered, and dried in a drying machine under reduced pressure at 120° C. for 6 hours to obtain 8.7 g of the target polymer compound [8] (hereinafter, referred to as HB-TmDAP). FIG. 4 shows the result of measuring a $^1$H-NMR spectrum of the HB-TmDAP.

The weight average molecular weight Mw of the HB-TmDAP, measured by GPC in terms of polystyrene, was 17,000, and the polydispersibility Mw/Mn was 3.20. To a platinum pan, 5 mg of the obtained HB-TmDAP was added, and subjected to a measurement at a temperature increase rate of 10° C./min in accordance with a TG-DTA measurement, thereby resulting in a 5% weight loss at 456° C.

[Comparative Example 1-3] Synthesis of Polymer Compound [10]

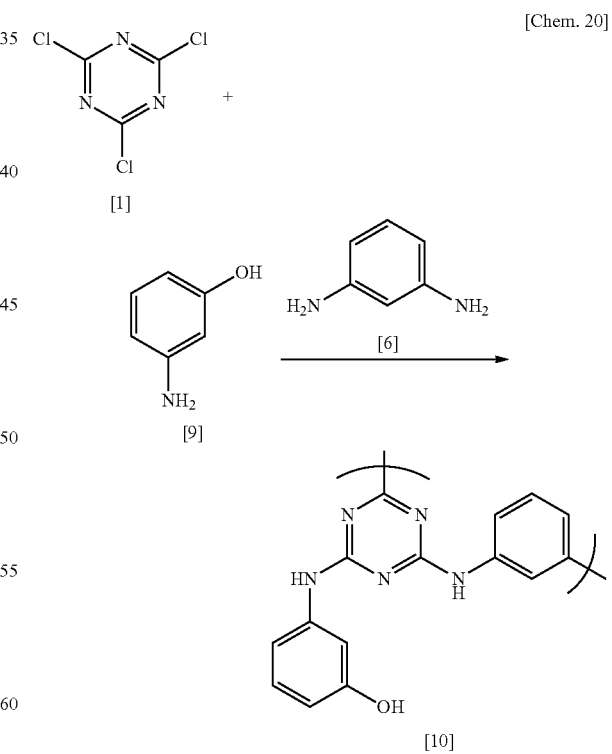

Under nitrogen, to a 500 mL four-neck flask, 3-aminophenol [9] (11.00 g, 0.1 mol, manufactured by Tokyo Chemical Industry Co., Ltd.) was added, and dissolved in 104.14 g of N-methyl-2-pyrrolidone (NMP, JUNSEI CHEMICAL CO., LTD.), and cooled to 0° C. or lower with an ethanol-dry ice bath. Thereafter, with 2,4,6-trichloro-1,3,5-triazine [1] (18.34 g, 0.1 mol, manufactured by Evonik Degussa) added thereto, stirring was performed for 1 hour, and then, m-phenylenediamine [6] (16.4 g, 0.15 mol, manufactured by AminoChem) dissolved in 154.96 g of NMP was added dropwise so as to keep the internal temperature at 30° C. or lower. After the delivery by drops, a reaction was developed for 3 hours by heating to 90° C., and 50.34 g of triethylamine was added to terminate the polymerization.

Figure 5:
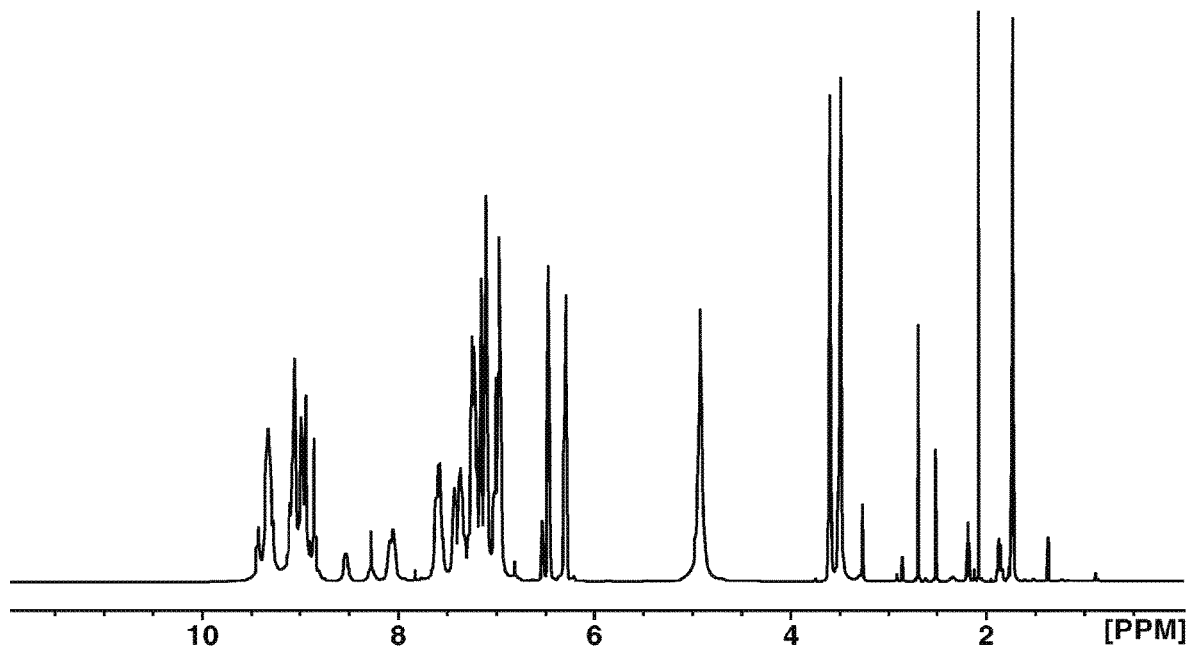
FIG. 5 is a ¹H-NMR spectrum of a polymer compound [10] obtained in Comparative Example 1-3.
Figure 6:
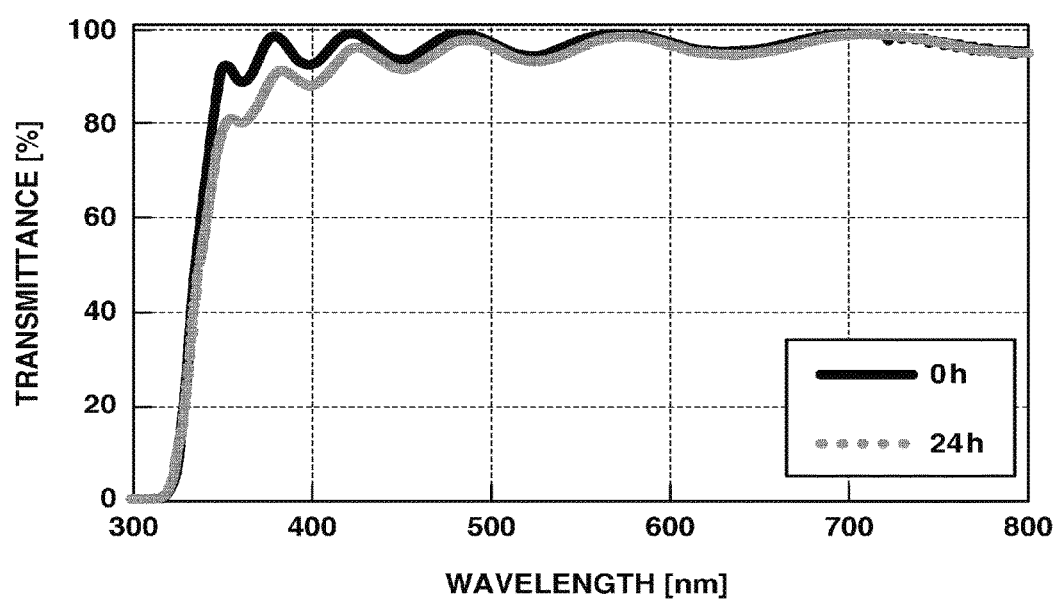
FIG. 6 is a view showing the transmittance change of a coating film prepared in Example 2-1 before and after a lightfastness test.
Figure 7:
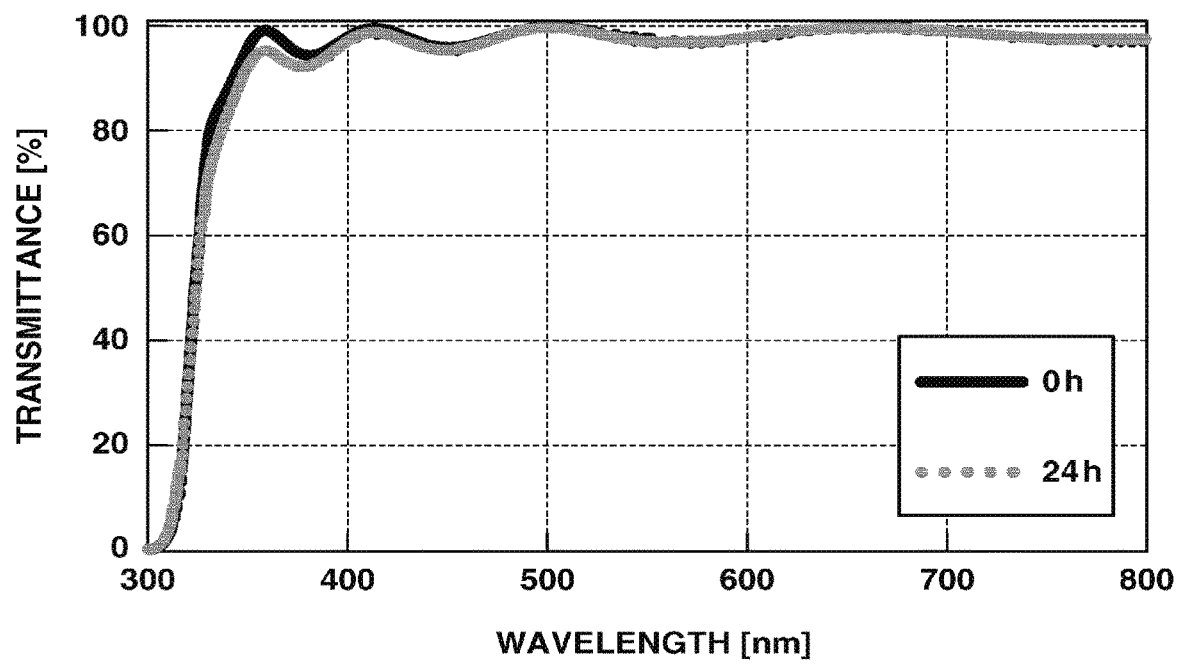
FIG. 7 is a view showing the transmittance change of a coating film prepared in Example 2-2 before and after a lightfastness test.
Figure 8:
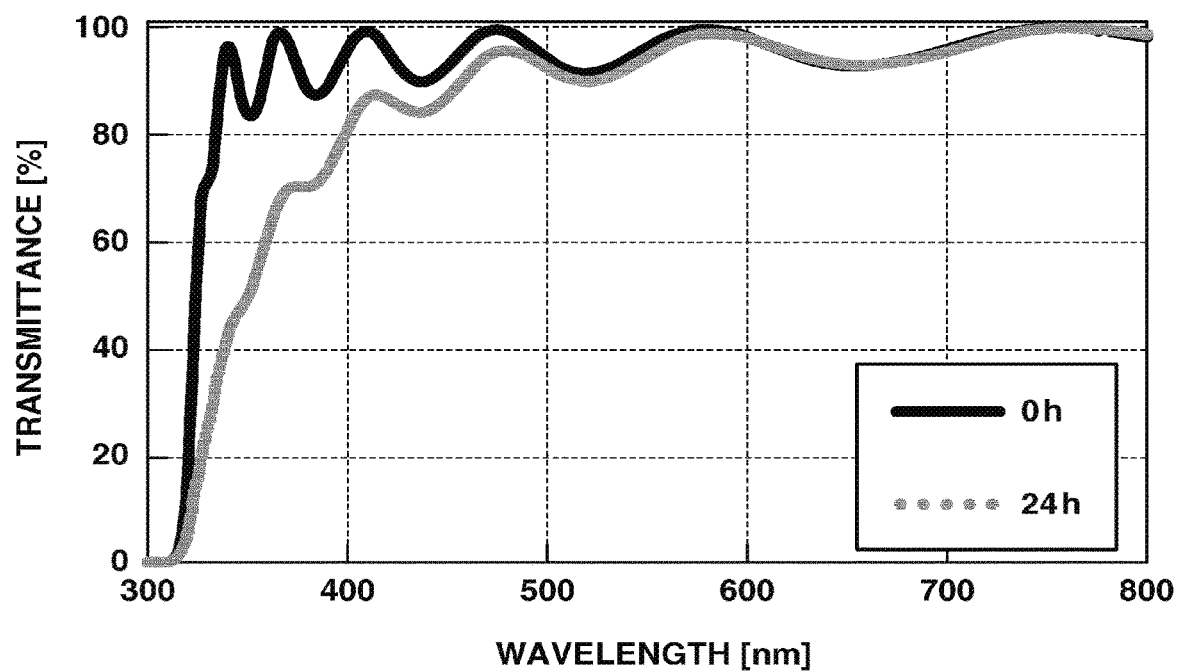
FIG. 8 is a view showing the transmittance change of a coating film prepared in Comparative Example 2-1 before and after a lightfastness test.
Figure 9:
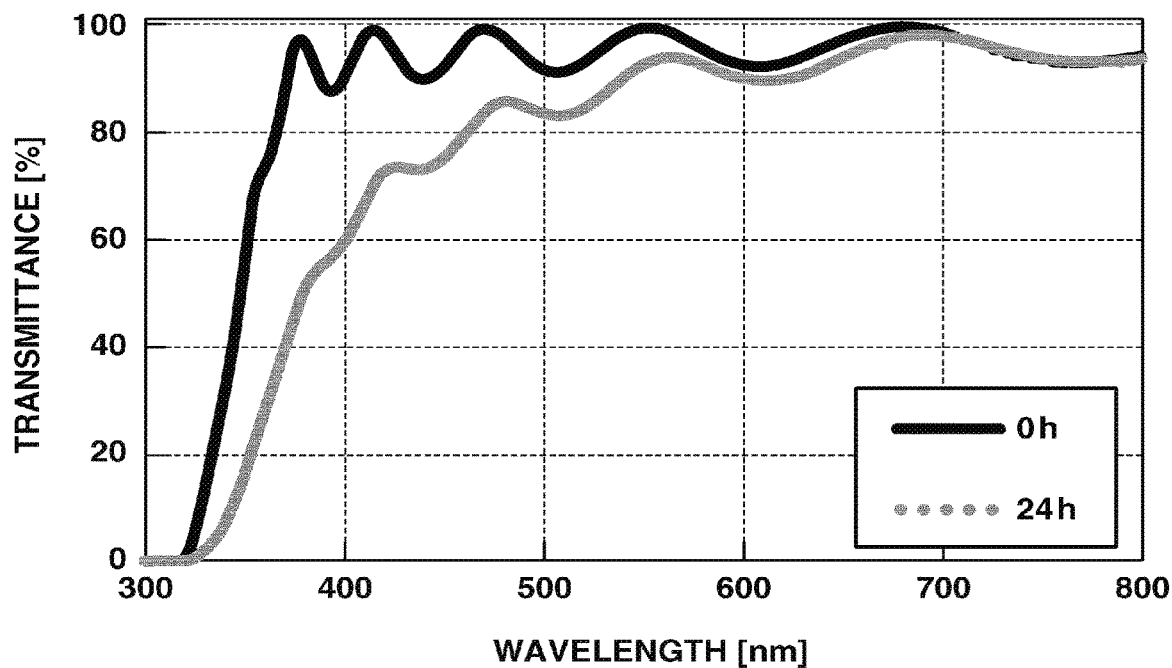
FIG. 9 is a view showing the transmittance change of a coating film prepared in Comparative Example 2-2 before and after a lightfastness test.
Figure 10:
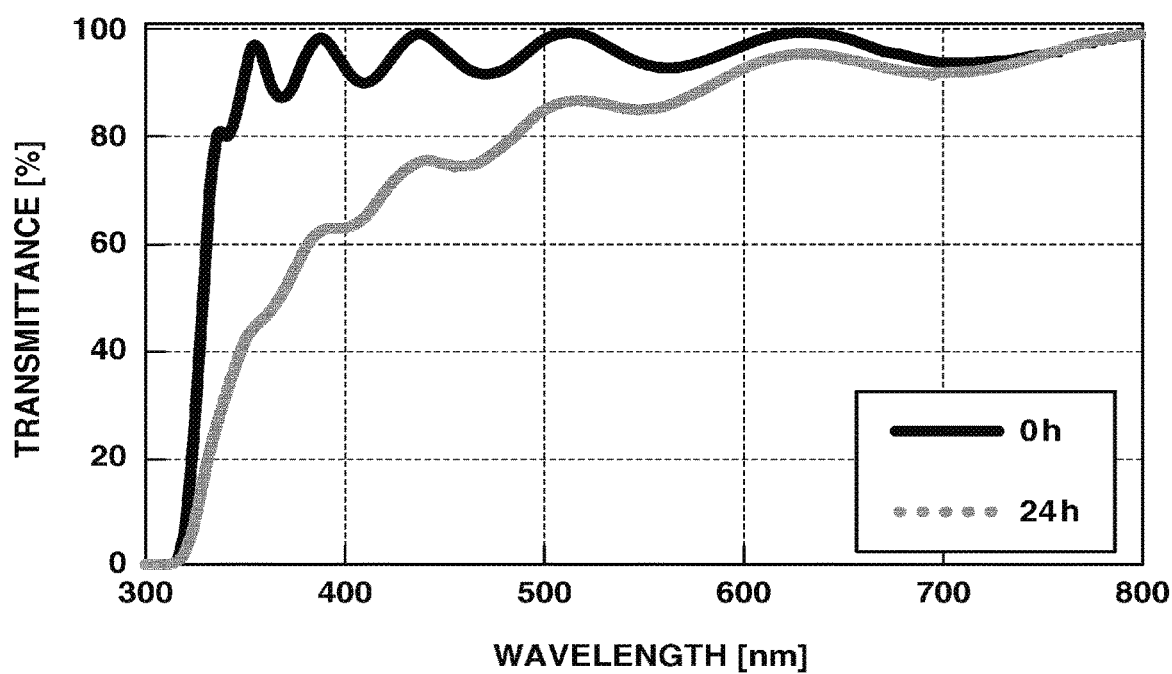
FIG. 10 is a view showing the transmittance change of a coating film prepared in Comparative Example 2-3 before and after a lightfastness test.
Figure 11:
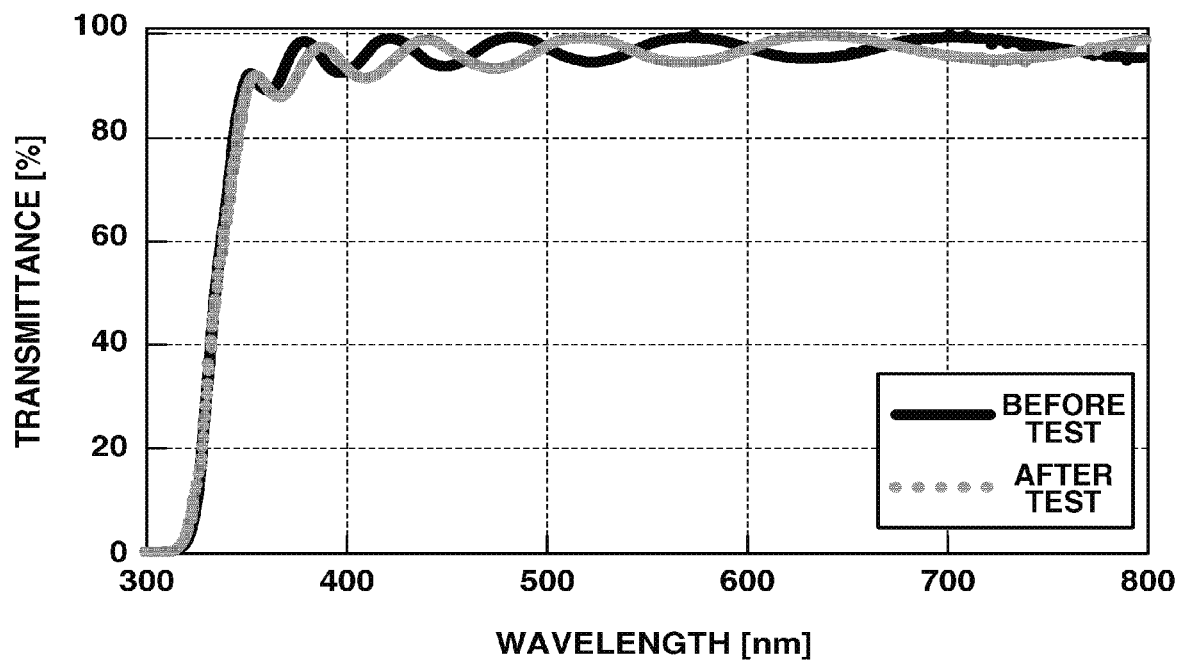
FIG. 11 is a view showing the transmittance change of a cured film prepared in Example 2-1 before and after a heat resistance test.
Figure 12:
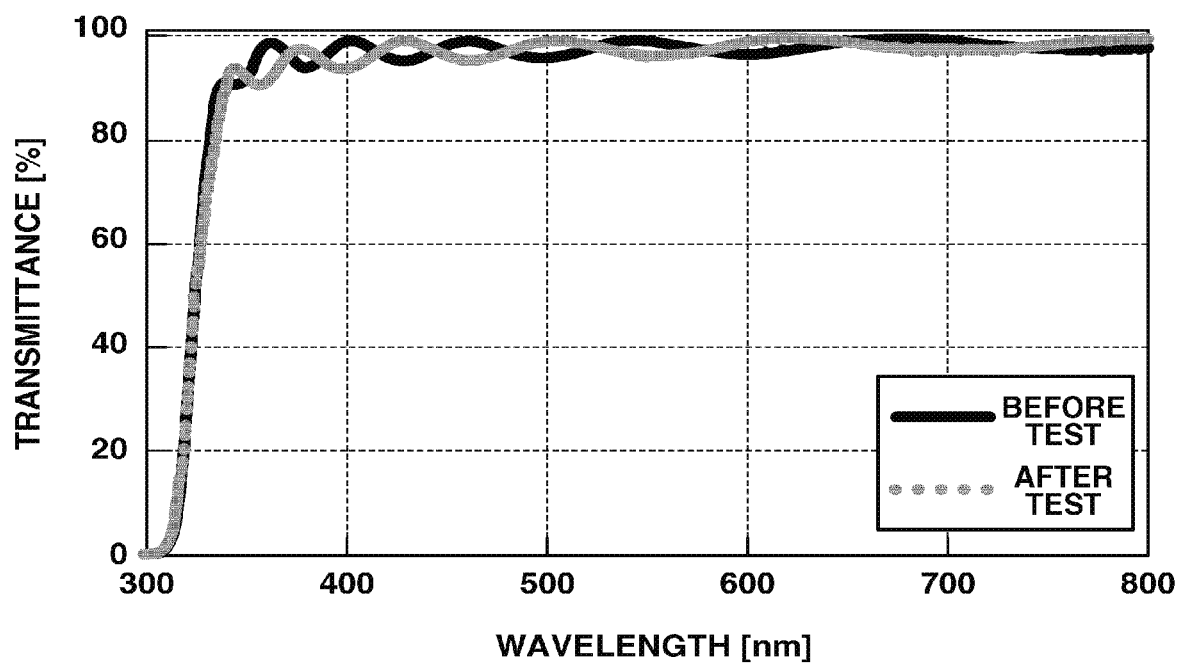
FIG. 12 is a view showing the transmittance change of a cured film prepared in Example 2-2 before and after a heat resistance test.
Figure 13:
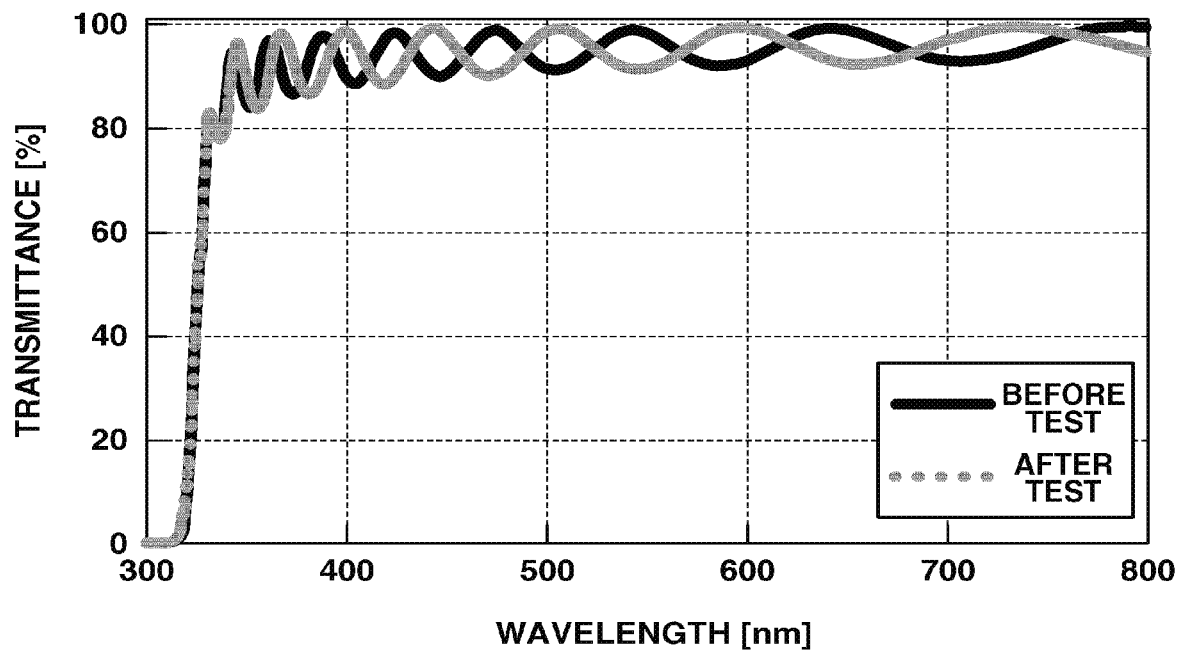
FIG. 13 is a view showing the transmittance change of a cured film prepared in Comparative Example 2-1 before and after a heat resistance test.
Figure 14:
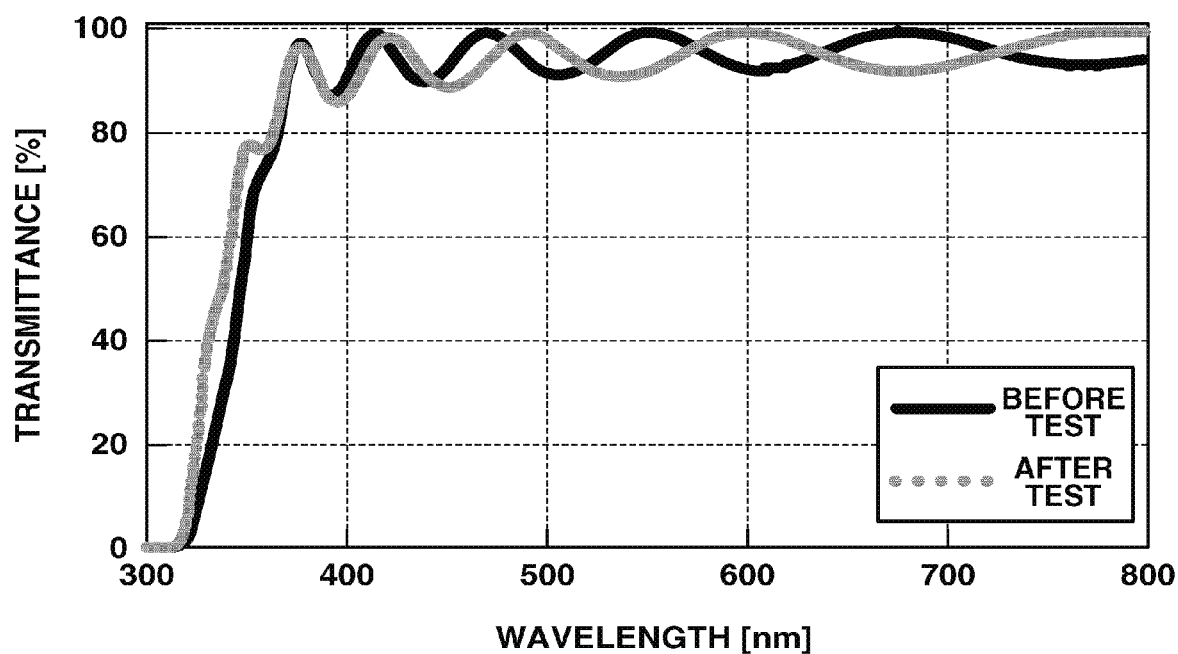
FIG. 14 is a view showing the transmittance change of a cured film prepared in Example 2-2 before and after a heat resistance test.
Figure 15:
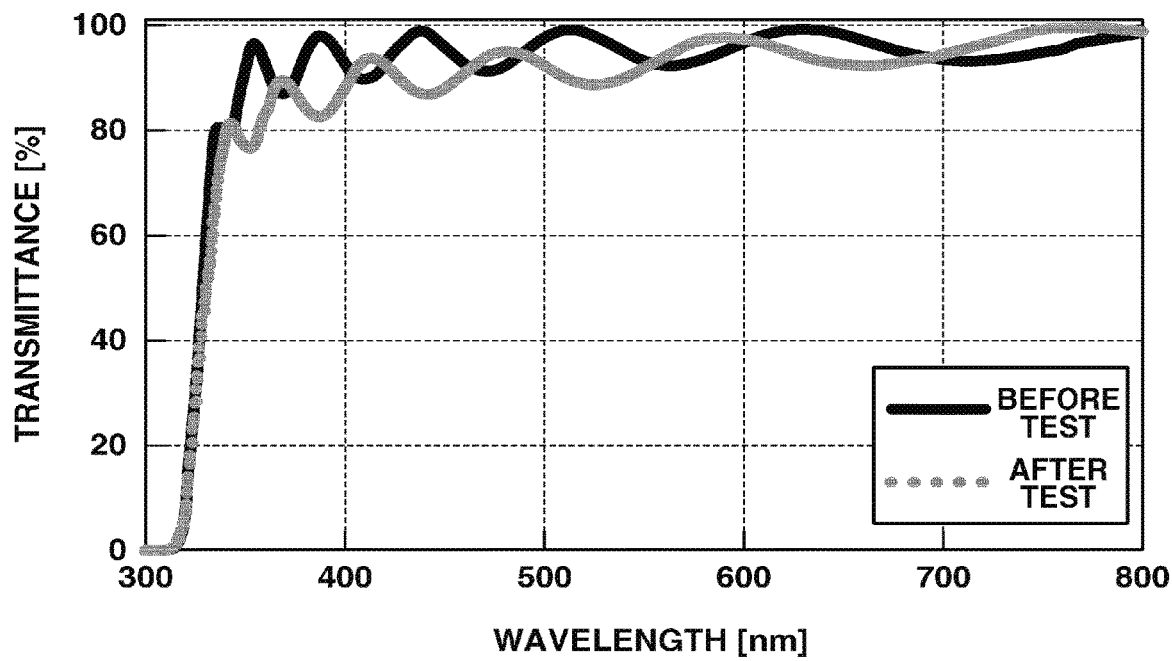
FIG. 15 is a view showing the transmittance change of a cured film prepared in Comparative Example 2-3 before and after a heat resistance test.

Purified triethylamine hydrochloride was removed by filtration, and the filtrate was added dropwise into 1,290 g of ion-exchanged water to cause reprecipitation. The obtained sediment was filtered, and the filtration residue was redissolved in 200 g of acetone, and further reprecipitated in 1,500 g of ion-exchanged water. The product obtained by filtering the sediment was dried at 100° C. for 8 hours to obtain 26.6 g of the target polymer compound [10] (hereinafter, referred to as L-TmDAP). FIG. 5 shows the result of measuring a $^1$H-NMR spectrum of the L-TmDAP.

The weight average molecular weight Mw of the L-TmDAP, measured by GPC in terms of polystyrene, was 8,200, and the polydispersibility Mw/Mn was 2.1. To a platinum pan, 5 mg of the obtained L-TmDAP was added, and subjected to a measurement at a temperature increase rate of 10° C./min in accordance with a TG-DTA measurement, thereby resulting in a 5% weight loss at 392° C.

[2] Preparation of Composition for Film Formation and Coating Film

Example 2-1

In 4.4 g of 1-methoxy-2-propanol (PGME), 0.6 g of HB-TBAPA obtained in Example 1-1 was dissolved to obtain a pale yellow transparent solution. The obtained polymer varnish was applied by spin coating onto a glass substrate at 200 rpm for 5 seconds and at 800 rpm for 30 seconds with the use of a spin coater, and heated at 120° C. for 3 minutes to remove the solvent, and obtain a coating film. The measured refractive index of the obtained coating film was 1.692.

Example 2-2

In the same way as in Example 2-1 except for the use of the HB-TFPA obtained in Example 1-2, a coating film was prepared, and the measured refractive index thereof was 1.636.

Comparative Example 2-1

In the same way as in Example 2-1 except for the use of the HB-TmDA40 obtained in Comparative Example 1-1, a coating film was prepared, and the measured refractive index thereof was 1.803.

Comparative Example 2-2

In the same way as in Example 2-1 except for the use of the HB-TmDAP obtained in Comparative Example 1-2, a coating film was prepared, and the measured refractive index thereof was 1.795.

Comparative Example 2-3

In the same way as in Example 2-1 except for the use of the L-TmDAP obtained in Comparative Example 1-3, a coating film was prepared, and the measured refractive index thereof was 1.756.

The coating films prepared in Examples 2-1 and 2-2 and Comparative Examples 2-1 to 2-3 mentioned above were each put in a lightfastness tester (0.50 W/m² (X=340 nm), black panel temperature: 40° C.), and the respective film thicknesses, changes in refractive index, and changes in transmittance after 24 hours were measured. The results are shown in Table 1 and FIGS. 6 to 10.

The evaluation criteria for the change in transmittance are as follows.

<Evaluation Criteria for Change in Transmittance>
○: transmittance of 85% or more at 400 nm
X: transmittance of less than 85% at 400 nm

TABLE 1

|  | initial | | after 24 hours | | | |
| --- | --- | --- | --- | --- | --- | --- |
|  | Refractive index (@ 550 nm) | Film thickness (nm) | Refractive index (@ 550 nm) | Film thickness (nm) | Refractive index change | Transmittance change |
| Example 2-1 | 1.692 | 856 | 1.685 | 878 | −0.007 | ○ |
| Example 2-2 | 1.636 | 606 | 1.637 | 606 | +0.001 | ○ |
| Comparative Example 2-1 | 1.803 | 631 | 1.799 | 636 | −0.004 | x |
| Comparative Example 2-2 | 1.795 | 758 | 1.794 | 771 | −0.001 | x |
| Comparative Example 2-3 | 1.756 | 710 | 1.767 | 715 | +0.011 | x |

The coating films prepared in Examples 2-1 and 2-2 and Comparative Examples 2-1 to 2-3 were each placed on a hot plate heated in advance to 250° C., and heated for 10 minutes, and the respective film thicknesses, changes in refractive index and changes in the transmittance were then measured. The results are shown in Table 2 and FIGS. 11 to 15.

It is to be noted that the evaluation criteria for the change in transmittance are the same as mentioned above.

TABLE 2

|  | initial | | after 24 hours | | | |
| --- | --- | --- | --- | --- | --- | --- |
|  | Refractive index (@ 550 nm) | Film thickness (nm) | Refractive index (@ 550 nm) | Film thickness (nm) | Refractive index change | Transmittance change |
| Example 2-1 | 1.692 | 856 | 1.702 | 758 | +0.010 | ○ |
| Example 2-2 | 1.632 | 829 | 1.633 | 768 | +0.001 | ○ |
| Comparative Example 2-1 | 1.808 | 896 | 1.795 | 828 | −0.013 | ○ |
| Comparative Example 2-2 | 1.795 | 758 | 1.807 | 663 | +0.012 | ○ |
| Comparative Example 2-3 | 1.756 | 710 | 1.776 | 662 | +0.020 | x |

As shown in Table 1 and FIGS. 6 to 10, the triazine polymer coating films prepared in Examples 2-1 and 2-2 and Comparative Examples 2-1 to 2-3 are low in refractive index change rate after 24 hours, whereas the coating films prepared from the varnishes of Comparative Examples 2-1 to 2-3 are large in the change in transmittance, and thus, it is determined that Examples 2-1 and 2-2 have better lightfastness. In addition, as shown in Table 2 and FIGS. 11 to 15, it is determined that Examples 2-1 and 2-2 are small in the change in transmittance even after heating at 250° C., and thus also excellent in heat resistance.

In particular, according to Example 2-1, it is determined that a film with a high refractive index of 1.69 is obtained.

On the other hand, it is determined that Example 2-2 is high in transmittance, with favorable lightfastness and heat resistance.

In the case where the coating films prepared in Examples 2-1 and 2-2 and Comparative Examples 2-1 to 2-3 were dissolved in cyclohexanone (CHN) and propylene glycol monomethyl ether (PGME) respectively so as to reach 10% by weight and 20% by weight, and in the case where the coating films were dissolved in a large amount of 2.38% by weight tetramethylammonium hydroxide (TMAH) aqueous solution, whether or not there was any insoluble matter was visually confirmed, and evaluated in accordance with the following criteria. The results are shown in Table 3.

<Evaluation Criteria>
○: No insoluble matter
Δ: Slight scattering
X: Precipitate

TABLE 3

| | CHN | | PGME | | 2.38% by |
| | 10% by weight | 20% by weight | 10% by weight | 20% by weight | weight TMAH aqueous solution |
|---|---|---|---|---|---|
| Example 2-1 | ○ | ○ | ○ | ○ | ○ |
| Example 2-2 | ○ | ○ | ○ | ○ | ○ |
| Comparative Example 2-1 | ○ | ○ | x | x | x |
| Comparative Example 2-2 | ○ | ○ | ○ | ○ | ○ |
| Comparative Example 2-3 | ○ | ○ | ○ | ○ | ○ |

It has been confirmed that the coating films prepared in Examples 2-1 and 2-2 and Comparative Examples 2-2 and 2-3 were dissolved in a 2.38% by weight TMAH aqueous solution as a developer. Thus, these compositions for film formation can be used as a photosensitive material. In particular, it has been confirmed that the use of the polymer varnish of Example 2-1 makes it possible to prepare a negative-type photosensitive material which allows for a coating film with a refractive index of 1.7, and also excellent heat resistance and lightfastness.

[3] Preparation of Composition for Cured Film Formation

Example 3-1

In 1.6 g of a mixed solvent of PGME cyclopentanone (CPN) and water (96/4 (v/v)), 0.4 g of the HB-TBAPA synthesized in Example 1-1 was dissolved, followed by the addition of 0.2 g of polyfunctional acrylate (A-DPH-48E, manufactured by Shin-Nakamura Chemical Co., Ltd.) and 0.05 g of polyfunctional acrylate (Aronix M-510, manufactured by Toagosei Chemical Industry Co., Ltd.) in a 20% by weight CPN solution as a crosslinking agent, 0.8 g of Irgacure OXE01 (manufactured by BASF) in a 5% by weight CPN solution as a photoradical initiator, 0.4 g of KBE-503 (manufactured by Shin-Etsu Silicone Co., Ltd.) in a 1% by weight CPN solution as a silane coupling agent, 0.02 g of MegaFac R-40 (manufactured by DIC Corporation) in a 1% by weight CPN solution as a surfactant, and 0.65 g of CPN, and the dissolution thereof were visually confirmed, thereby preparing a varnish (hereinafter, referred to as HB-TBAPAV1) with a total solid content of 12% by weight.

[4] Preparation of Cured Film

Example 4-1

The HB-TBAPAV1 prepared in Example 3-1 was applied by spin coating onto a non-alkali glass substrate at 200 rpm for 5 seconds and 800 rpm for 30 seconds with the use of a spin coater, subjected to calcination at 120° C. for 1 minute with the use of a hot plate, and then irradiated with ultraviolet rays at an irradiance level of 400 mJ/cm² at 365 nm in an ultraviolet irradiation apparatus MA6 (manufactured by SUSS). Thereafter, a cured film was obtained by curing at 230° C. for 5 minutes. The measured refractive index of the cured film obtained was 1.686.

Figure 16:
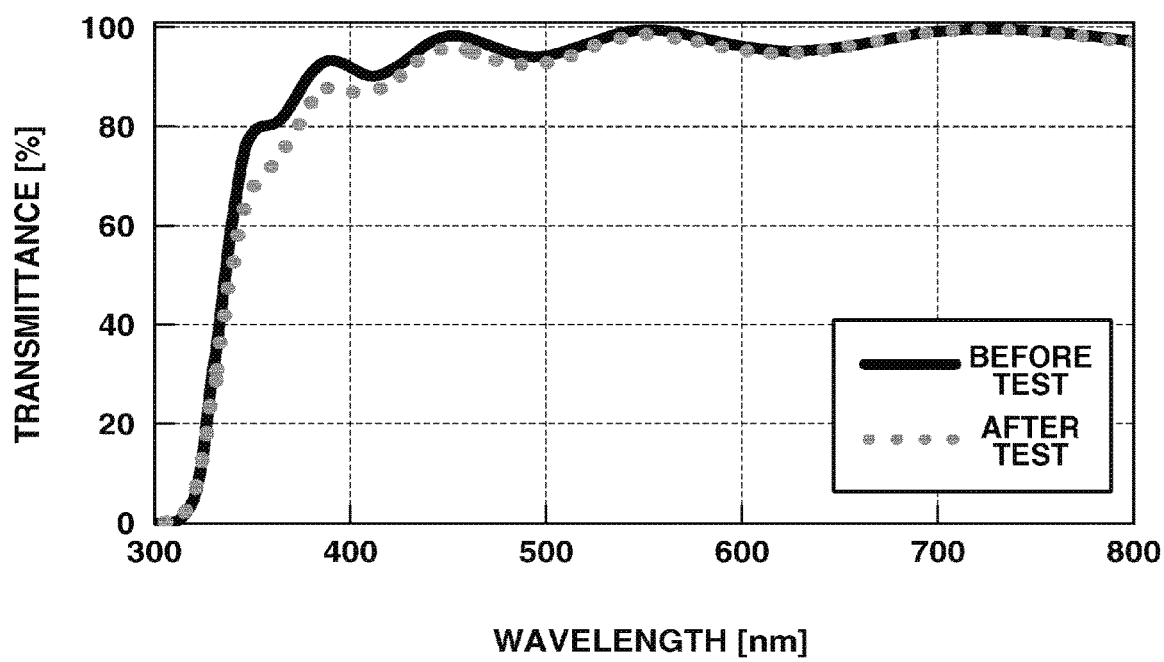
FIG. 16 is a view showing the transmittance change of a cured film prepared in Example 4-1 before and after a lightfastness test.

The cured film prepared in Example 4-1 mentioned above were each put in a lightfastness tester (0.50 W/m² (λ=340 nm), black panel temperature: 50° C.), and the film thickness, change in refractive index, and change in transmittance after 24 hours were measured. The results are shown in Table 4 and FIG. 16.

TABLE 4

| | initial | | after 24 hours | | |
| | Refractive index (@ 550 nm) | Film thickness (nm) | Refractive index (@ 550 nm) | Film thickness (nm) | Refractive index change |
|---|---|---|---|---|---|
| Example 4-1 | 1.686 | 665 | 1.679 | 680 | −0.007 |

[5] Evaluation of Pattern Formability

Example 5-1

The HB-TBAPAV1 prepared in Example 3-1 was filtered through a 0.20 m filter, and applied by spin coating onto a soda-lime glass substrate at 200 rpm for 5 seconds and 800 rpm for 30 seconds with the use of a spin coater, subjected to pre-calcination at 120° C. for 1 minute with the use of a hot plate, and then irradiated with ultraviolet rays at an irradiance level of 400 mJ/cm² at 365 nm through a photomask in an ultraviolet irradiation apparatus MA6 (manufactured by SUSS). Thereafter, development was performed by immersion in a 2.38% by weight TMAH aqueous solution at 23° C. for 60 seconds, and washing was further performed with running ultrapure water. Thereafter, a cured film with a pattern shape was obtained by baking at 230° C. for 5 minutes. Furthermore, it was confirmed with an optical microscope that there was no residue at the unexposed site in a 500 m square pattern.

The invention claimed is:

1. A triazine-ring-containing polymer comprising a repeating unit structure represented by the following formula (1):

[Chem. 1]

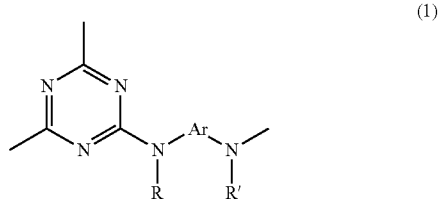

(1)

wherein R and R' each independently represent a hydrogen atom, an alkyl group, an alkoxy group, an aryl group, or an aralkyl group, and Ar represents at least one selected from the group represented by formulas (2) and (3),

[Chem. 2]

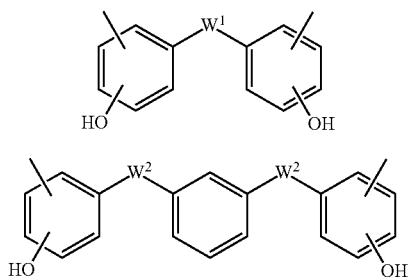

wherein $W^1$ and $W^2$ are each independently $CR^1R^2$ ($R^1$ and $R^2$ each independently represent a hydrogen atom or an alkyl group having 1 to 10 carbon atoms, which may be substituted with a halogen atom (provided that these groups may together form a ring)), CO=O, S, SO, or $SO_2$.

2. The triazine-ring-containing polymer according to claim 1, wherein the $W^1$ and $W^2$ each independently represent $CR^1R^2$ ($R^1$ and $R^2$ each independently represent a hydrogen atom or an alkyl group having 1 to 10 carbon atoms, which may be substituted with a halogen atom), or O.

3. The triazine-ring-containing polymer according to claim 1, wherein the Ar is represented by the formula (4).

[Chem. 3]

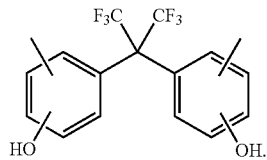

4. The triazine-ring-containing polymer according to claim 3, wherein the Ar is represented by the formula (5).

[Chem. 4]

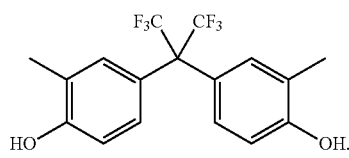

5. The triazine-ring-containing polymer according to claim 1, wherein the Ar is represented by the formula (6) or (7).

[Chem. 5]

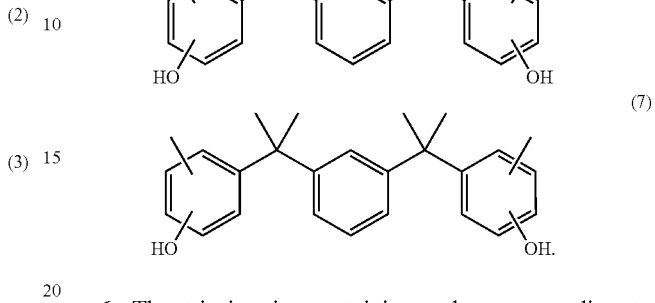

6. The triazine-ring-containing polymer according to claim 5, wherein the Ar is represented by the formula (8) or (9).

[Chem. 6]

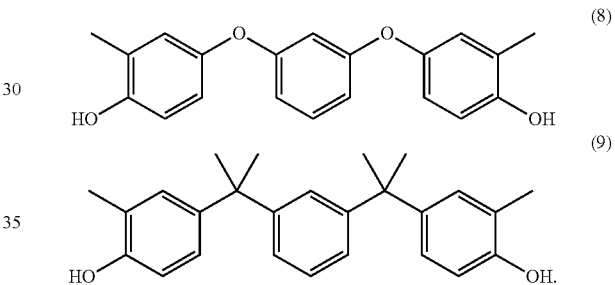

7. A triazine-based polymer-containing composition comprising the triazine-ring-containing polymer according to claim 1 and an organic solvent.

8. The triazine-based polymer-containing composition according to claim 7, further comprising a crosslinking agent.

9. The triazine-based polymer-containing composition according to claim 8, wherein the crosslinking agent is a polyfunctional (meth)acrylic compound.

10. A film obtained from the triazine-based polymer-containing composition according to claim 7.

11. A pattern prepared from the triazine-based polymer-containing composition according to claim 8.

12. An electronic device comprising: a substrate; and the film according to claim 10, formed on the substrate.

13. An optical member comprising: a substrate; and the film according to claim 10, formed on the substrate.

14. An electronic device comprising: a substrate; and the pattern according to claim 11, formed on the substrate.

* * * * *